(12) United States Patent
Goelst et al.

(10) Patent No.: US 10,938,190 B1
(45) Date of Patent: Mar. 2, 2021

(54) SEISMIC CABINET MOUNTS

(71) Applicants: Mac A. Goelst, Bend, OR (US); Luke Wright, Snoqualmie, WA (US)

(72) Inventors: Mac A. Goelst, Bend, OR (US); Luke Wright, Snoqualmie, WA (US)

(*) Notice: Subject to any disclaimer, the term of this patent is extended or adjusted under 35 U.S.C. 154(b) by 0 days.

(21) Appl. No.: 16/919,778

(22) Filed: Jul. 2, 2020

(51) Int. Cl.
*H02B 1/54* (2006.01)
*F16B 12/30* (2006.01)
*A47B 97/00* (2006.01)

(52) U.S. Cl.
CPC .............. *H02B 1/54* (2013.01); *A47B 97/00* (2013.01); *F16B 12/30* (2013.01)

(58) Field of Classification Search
CPC ............ H02B 1/54; F16B 12/30; A47B 97/00
USPC ........................................................ 248/560
See application file for complete search history.

(56) References Cited

U.S. PATENT DOCUMENTS

| | | | | |
|---|---|---|---|---|
| 5,228,762 | A * | 7/1993 | Mascrier | H02B 1/01 312/265.1 |
| 6,516,955 | B1 * | 2/2003 | Dudhwala | A47B 47/0008 211/182 |
| D867,108 | S * | 11/2019 | Bowron | D8/354 |
| 2011/0017689 | A1 * | 1/2011 | Randolph | B64D 11/003 211/86.01 |
| 2013/0091691 | A1 * | 4/2013 | Oetlinger | F16B 12/50 29/525.02 |
| 2013/0125342 | A1 * | 5/2013 | Lupa | A47B 91/06 16/30 |
| 2017/0290426 | A1 * | 10/2017 | Hovenden | F16B 12/02 |
| 2018/0283426 | A1 * | 10/2018 | Oetlinger | F16B 12/50 |
| 2018/0360210 | A1 * | 12/2018 | Goelst | A47B 47/0091 |
| 2019/0142159 | A1 * | 5/2019 | Endelman | F16B 12/30 248/188.8 |

* cited by examiner

*Primary Examiner* — Muhammad Ijaz
(74) *Attorney, Agent, or Firm* — Mark S Hubert

(57) ABSTRACT

A system of floor mounts and wall brackets for the attachment of a cabinet of any configuration (upper, lower or tall) to a building's wall and/or floor in a secure enough manner to resist the lateral and vertical forces of an earthquake, therein seismically qualifying the components of this cabinet mounting system. The components are adaptable to any style of cabinets provided they have a flat bottom face rather than a stepped bottom face. With this system, any cabinet maker can now present their cabinets as seismically qualified as long as their carcass utilizes these seismic mounts.

12 Claims, 25 Drawing Sheets

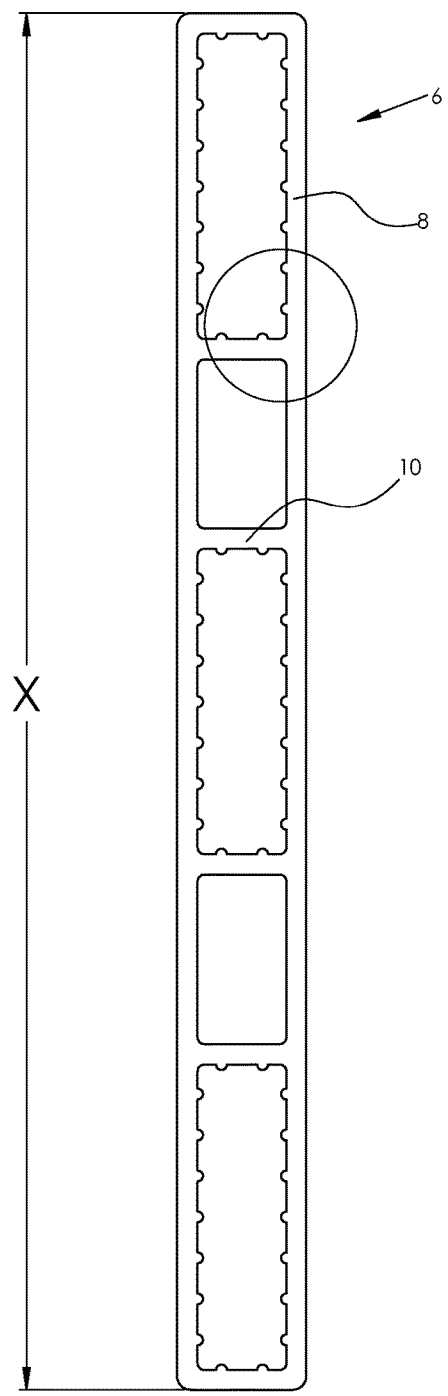
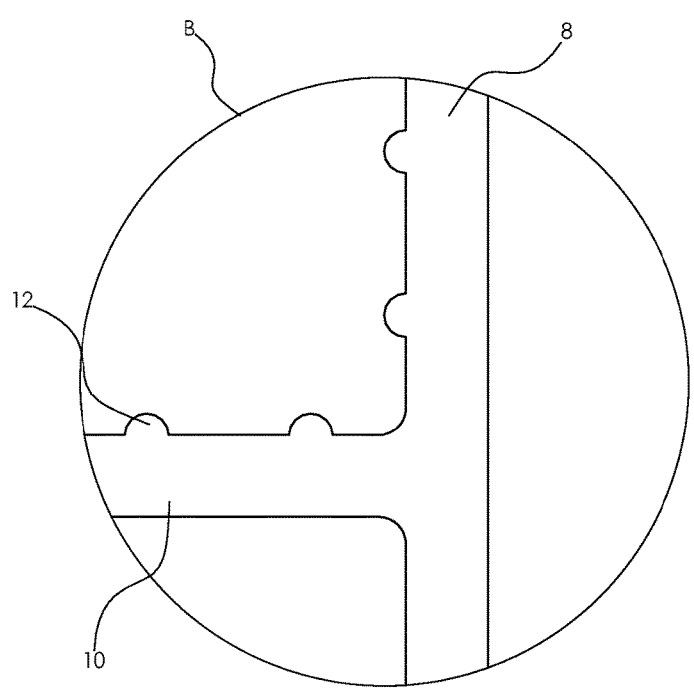
FIG 2
FIG 3

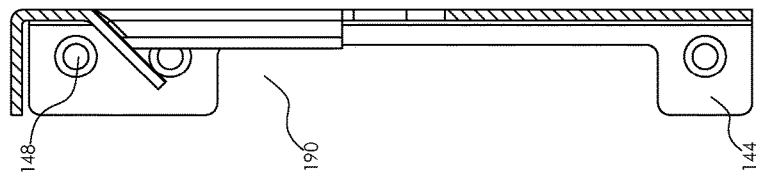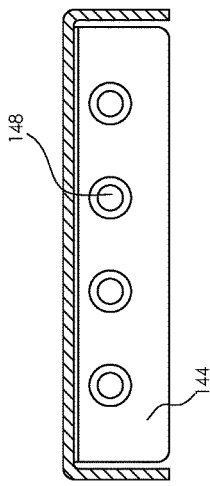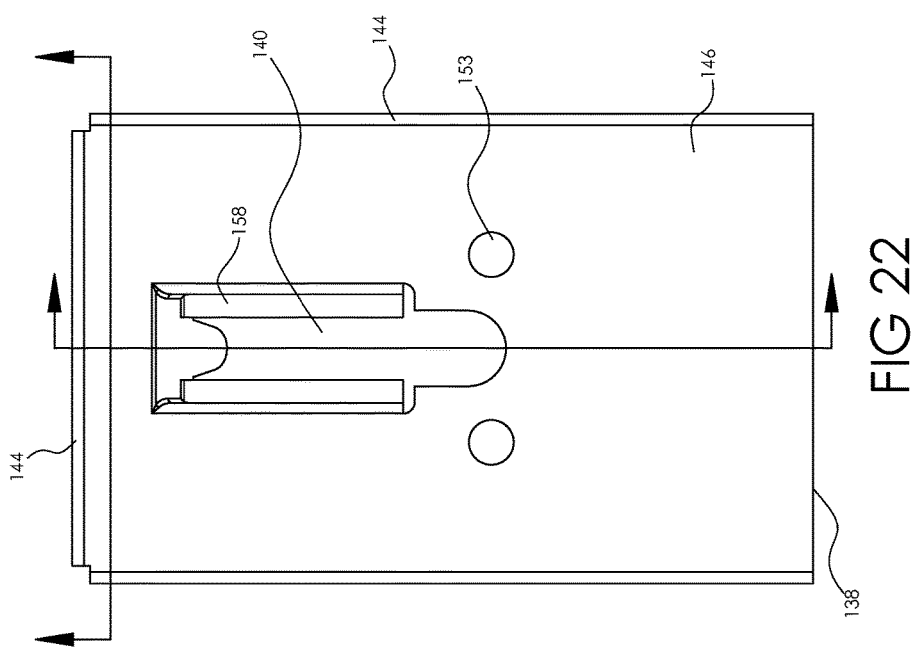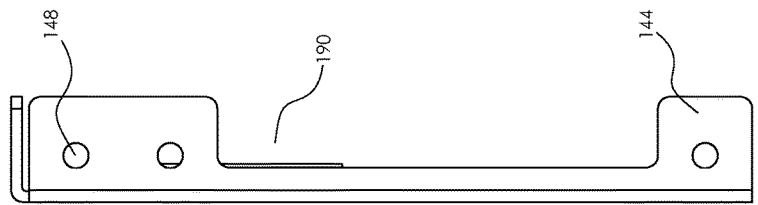

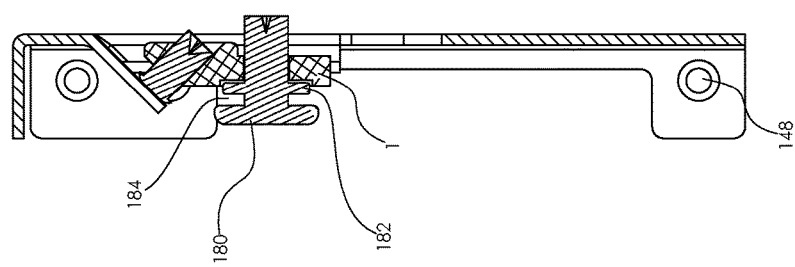
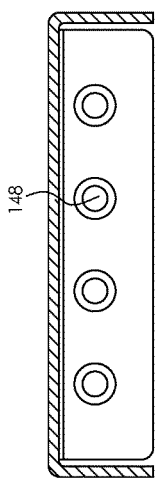
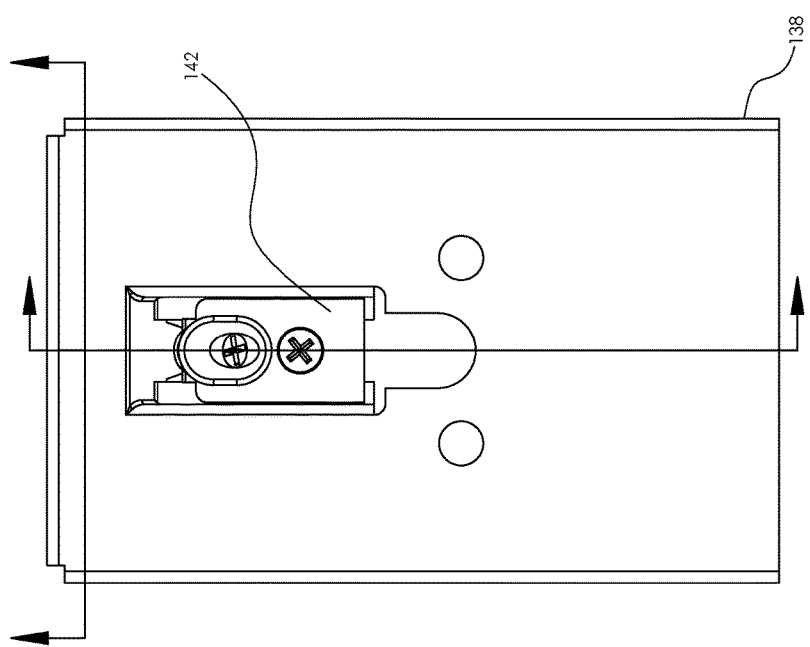
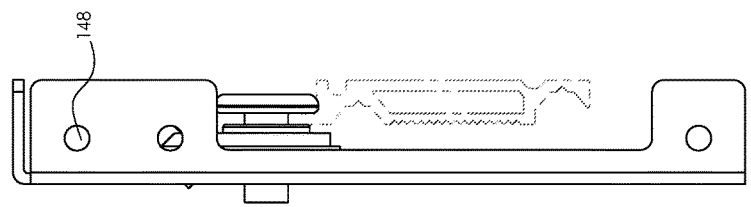

US 10,938,190 B1

SEISMIC CABINET MOUNTS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to cabinet or carcass hardware, and more particularly to seismic hanger technology as applied to upper, lower and tall cabinets.

BACKGROUND

In earthquake situations, many of the people that are injured, incur their injuries because of things that fall onto them. Commonly cabinets, loaded with heavy items, are one of the first things to topple down or over in an earthquake situation. For this reason, new building construction as well as retrofitting/rebuilding efforts must comply with the newest seismic codes requiring cabinets, cupboards, appliances and the like, to be seismically mounted when installed.

Meeting these new codes often results in overkill, wherein oversized fasteners are used to secure things in an unsightly manner to the building walls or floor. These are often accomplished with just 'field modifications" that are visible and sometimes require severe altering of the cabinets to install, therein destroying the cabinet's aesthetics or affecting the overall dimensions of the assembled cabinet banks. These are not things one wants done to their already expensive, custom cabinetry.

Henceforth, a set of cabinet mounts that will withstand earthquakes, is adjustable in height for leveling and adjustable in depth for wall spacing, is capable of getting state and federal seismic approval and that can be used with the mounting of upper, lower and tall cabinets would fulfill a long felt need in the construction industry. This new invention utilizes and combines known and new technologies in a unique and novel configuration to overcome the aforementioned problems and accomplish this.

BRIEF SUMMARY

In accordance with various embodiments, a system of seismic mounts including a floor mount and a wall mount for a flat bottomed, tall cabinet or a floor mount for a flat bottomed lower base cabinet and a wall mount for its corresponding upper cabinet. Both the floor mount and the wall mount have horizontal leveling adjustments. The wall mount also has a front to back adjustment. Each of the mounts meet all legal requirements for seismic qualification. There are two different designs of the floor mounts utilizing mitered toekick plates or squared toekick plates. There is two different wall mounts that use the same mounting rail.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 2 is an end view of the squared toekick floor mount panel;

FIG. 3 is an enlarged view of section B of FIG. 2;

FIGS. 19-22 are the side, top, side cross sectional and front views of the lower corner mounting bracket.

FIGS. 25-28 are the side, top, side cross sectional and front views of the upper corner mounting bracket.

DETAILED DESCRIPTION OF CERTAIN EMBODIMENTS

Figure 1:
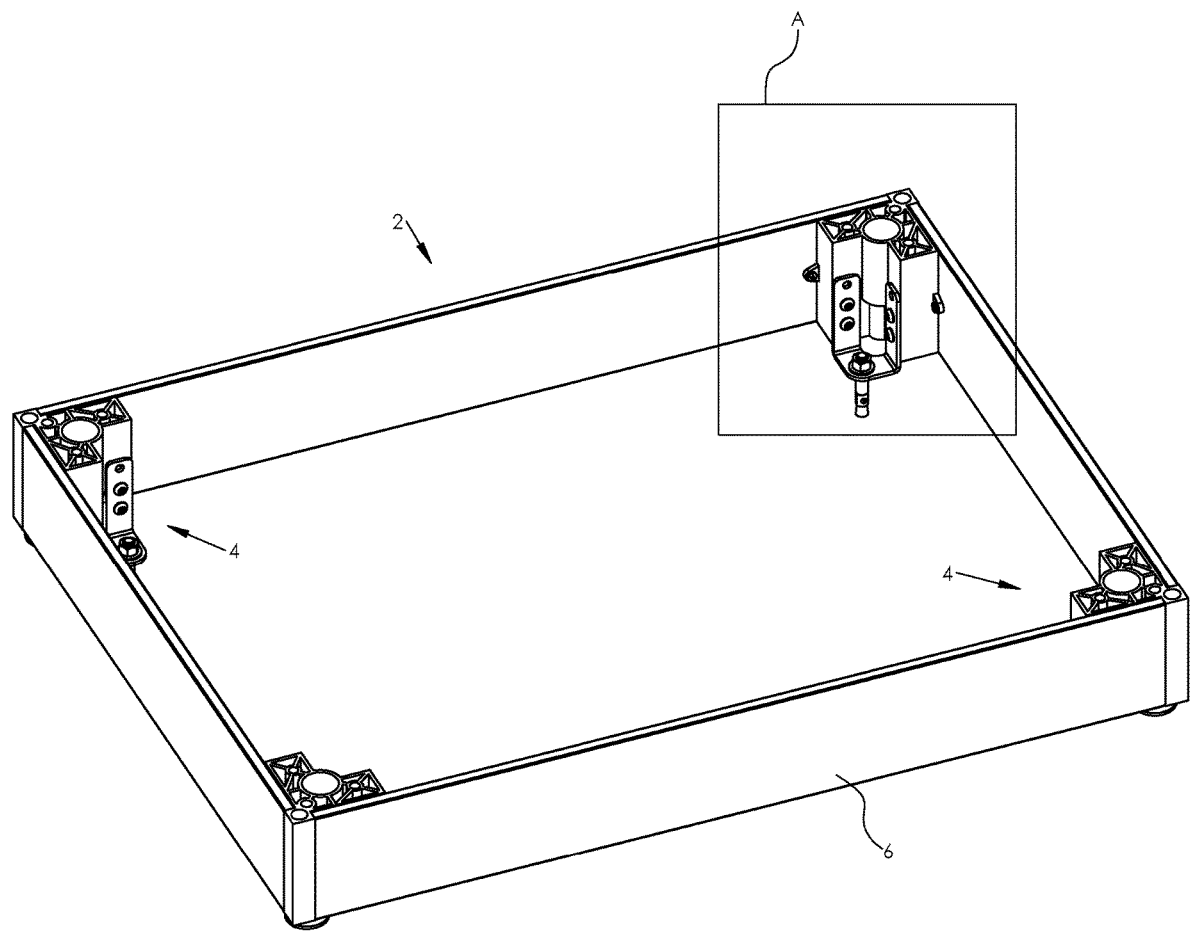
FIG. 1 is a perspective side view of the squared toekick floor mount.
Figure 4:
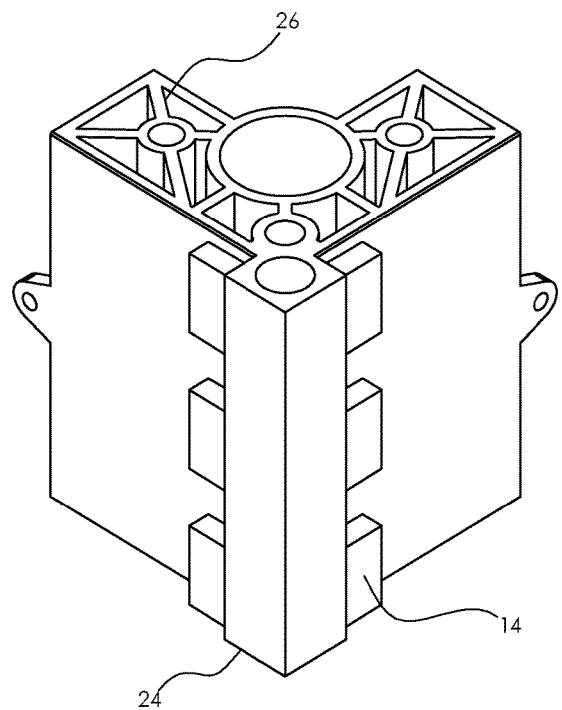
FIG. 4 is a perspective side view of the outside corner of the squared leveling bracket.
Figure 5:
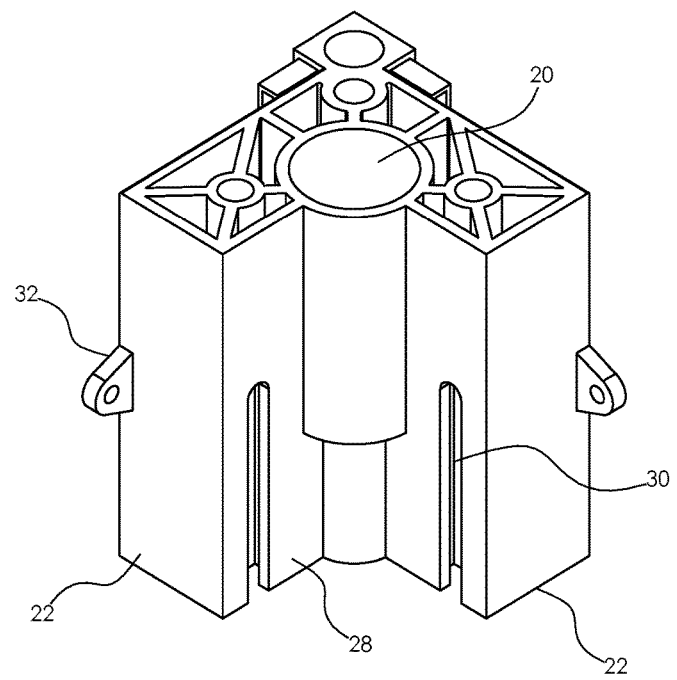
FIG. 5 is a perspective side view of the inside corner of the squared leveling bracket.
Figure 6:
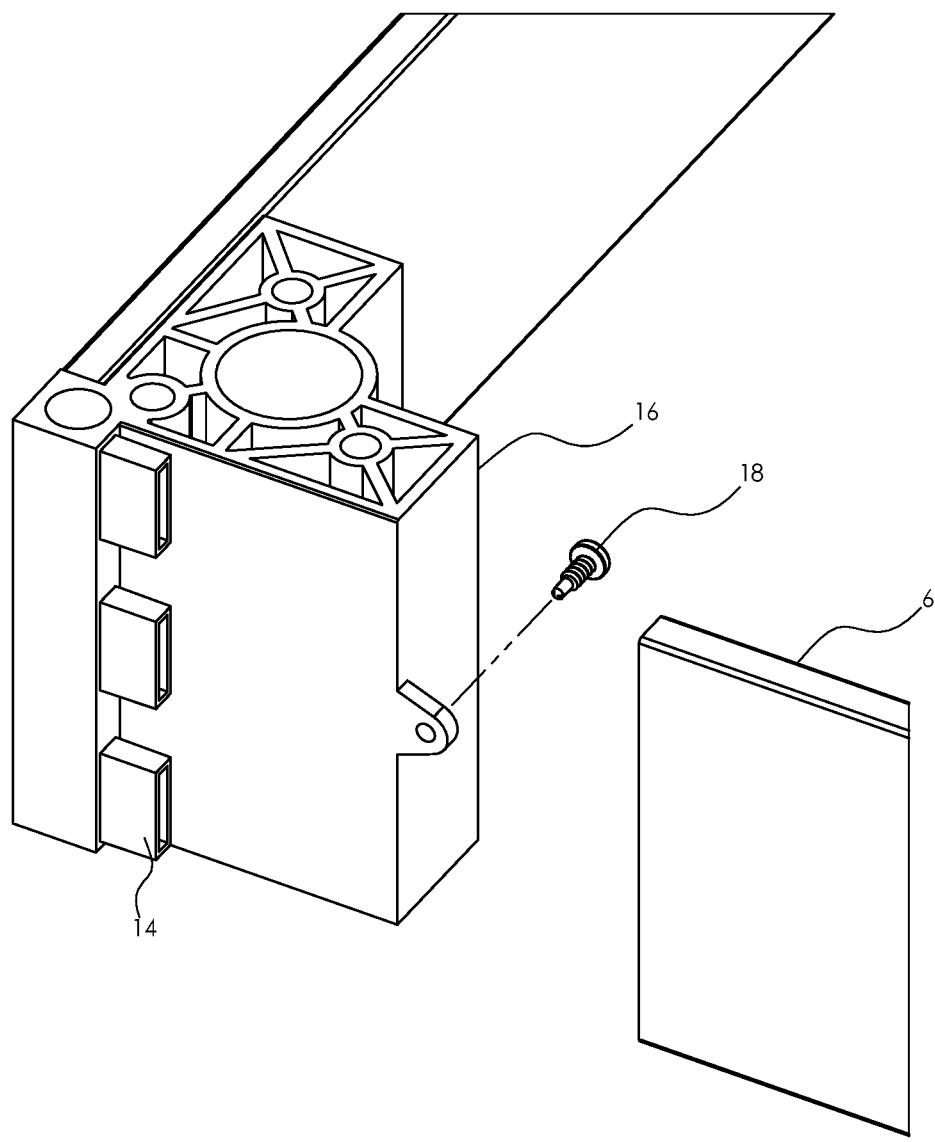
FIG. 6 is a perspective side view of a square toekick floor panel connecting to the outside corner of the squared leveling bracket.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" or "connectable to" another element or layer, it can be directly on, directly coupled to or directly connected to the other element or layer, or intervening elements or layers may be present. (Such as is the case with the seismic brackets that are directly connectable to the leveling bracket in one embodiment and indirectly connected in another embodiment.) In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein the term "mechanical fastener" refers to a physical device that is used to permanently or non-permanently join two or more objects together. These include but are not limited to set of threaded fasteners such as nuts and bolts, screws (cap screws and machine screws), studs, setscrews, nails, rivets, cross dowel joiners, pins, concrete anchors, bolts with expandable bolt anchors, and the functional equivalents thereof.

The present invention relates to a novel system for the attachment of a cabinet of any configuration (upper, lower or tall) to a building's wall and/or floor in a secure enough manner to resist the lateral and vertical forces of an earthquake, therein seismically qualifying the components of this cabinet mounting system. Since this system does not contain a cabinet itself, it is adaptable to any style of cabinet, provided they have a flat bottom face rather than a stepped bottom face. As such, any cabinet maker can now present their cabinets as seismically qualified as long as their carcass utilizes the seismic mounts described herein.

This system utilizes an upper and lower wall mount (rails and brackets) and/or either of a mitered toekick floor mount or a squared toekick floor mount. The selection of which toekick mount to use is really just a matter of preference as either are equally capable of withstanding a seismic event and constraining the vertical and lateral movements of the cabinet. The components of this system will be discussed with respect to a tall cabinet as it uses the components that both a base (floor) cabinet and a wall cabinet would require.

The floor mount assemblies both contain a leveling assembly and a seismic bracket along with the attendant mechanical fasteners to connect them to the floor and the toekick. The mitered toekick floor mount has an additional brace to pull the mitered toekick together at its top corners. The toekick floor mounts differ in that the seismic bracket and leveling bracket of the mitered toekick floor mount are not directly connected after leveling the cabinet. Rather, they are indirectly connected as each is mechanically attached to the toekick panels. In contrast, the seismic bracket and leveling bracket of the squared toekick floor mount are directly coupled together after leveling of the cabinet. This seismic system for mounting of a tall cabinet may be segregated into separate components and utilized as a seismic mount for an upper cabinet (using the upper and lower rail and bracket assemblies) and either of the two seismic floor mount assemblies for a base (lower) cabinet. The floor mounts constrain the base or tall cabinet from both vertical and horizontal motion. The wall mounts also constrain the upper or tall cabinet from vertical or horizontal motion but also reinforce the cabinet's carcass and ensure true square of the cabinet as they mount to two of the cabinet sides at each of the four corners of the cabinet back.

Squared Toekick Floor Mount

Looking at FIGS. 1-10, the squared toekick floor mount can best be explained. The squared toekick floor mount ready for connection to a flat bottomed cabinet carcass is best seen in FIG. 1. This complete mount has four identical corner assemblies 4 and four square cut toekick panels. The panels 6 must be cut into two pairs with each pair having two equal length panels. These panel lengths plus the width of two of the corners of the leveling mount, establish the width and depth of the cabinets. In the preferred embodiment the panels are made of aluminum, although other light, strong polymer, carbon fiber or composite material panels are also acceptable substitutes. Section A is illustrated in an enlarged format in FIG. 9.

Looking at FIGS. 2 and 3, it can be seen that the squared toekick floor mount panel 6 is a rectangular, extruded aluminum, planar, linear panel of a torsion box style construction. It has two thin planar outer faces 8 held in a parallel spaced configuration by a grid of spacer stiffening strips 10. In the preferred embodiment these spacer stiffening strips 10 are parallel to each other. (The squared toekick floor mount panel 6 is designed to resist torsion under an applied load.) In the enlarged section taken from FIG. 1, the friction ridges 12 can be seen running along the internal voids of the squared toekick floor mount panel 6. These friction ridges 12 are used to aid in the locking of the six panel tabs 14 of the squared leveling bracket 16 into the matingly engageable internal voids accessible at the end of the squared toekick floor mount panel 6 prior to the attachment of the squared leveling bracket 16 to the squared toekick panels 6 with mechanical fasteners such as self-drilling, self-tapping screws 18.

Besides the squared toekick panels 6, the squared seismic bracket 34 (FIG. 7), and the attendant mechanical fasteners, the squared toekick floor mount has a squared leveling bracket 16 housing a central, threaded cylindrical insert that threadingly engages a vertically adjustable, rotatable leveling foot 19. (FIGS. 4-6) This leveling foot 19 is a threaded post 48 extending normally from the top face of a circular disk 50. This leveling bracket 16 has an L configuration with identical perpendicular hollow sides 22 that connect at a square corner socket 24, and a central right cylindrical bore 20 that houses the threaded cylindrical insert. The outer corner socket 24 has six rectangular panel tabs 14 that extend parallel to the linear axis of the squared toekick floor mount panels 6 to which they connect. The sides 22 are rectangular sections that are internally reinforced with webbing 26. (In the preferred embodiment this internal webbing in each rectangular section is a central, hollow right cylinder with walls extending radially from its exterior surface to the interior walls of the sides 22.) Cut into the interior wall 28 of each side 22 is a vertical, seismic bracket slot 30. Extending normally from the front edge of each side 22 is a screw tab 32 for connection to the squared toekick panel 6. The squared leveling bracket 16 is intended to be made from a lightweight, strong material such as an extruded aluminum, polymer, carbon fiber or composite material.

Figure 7:
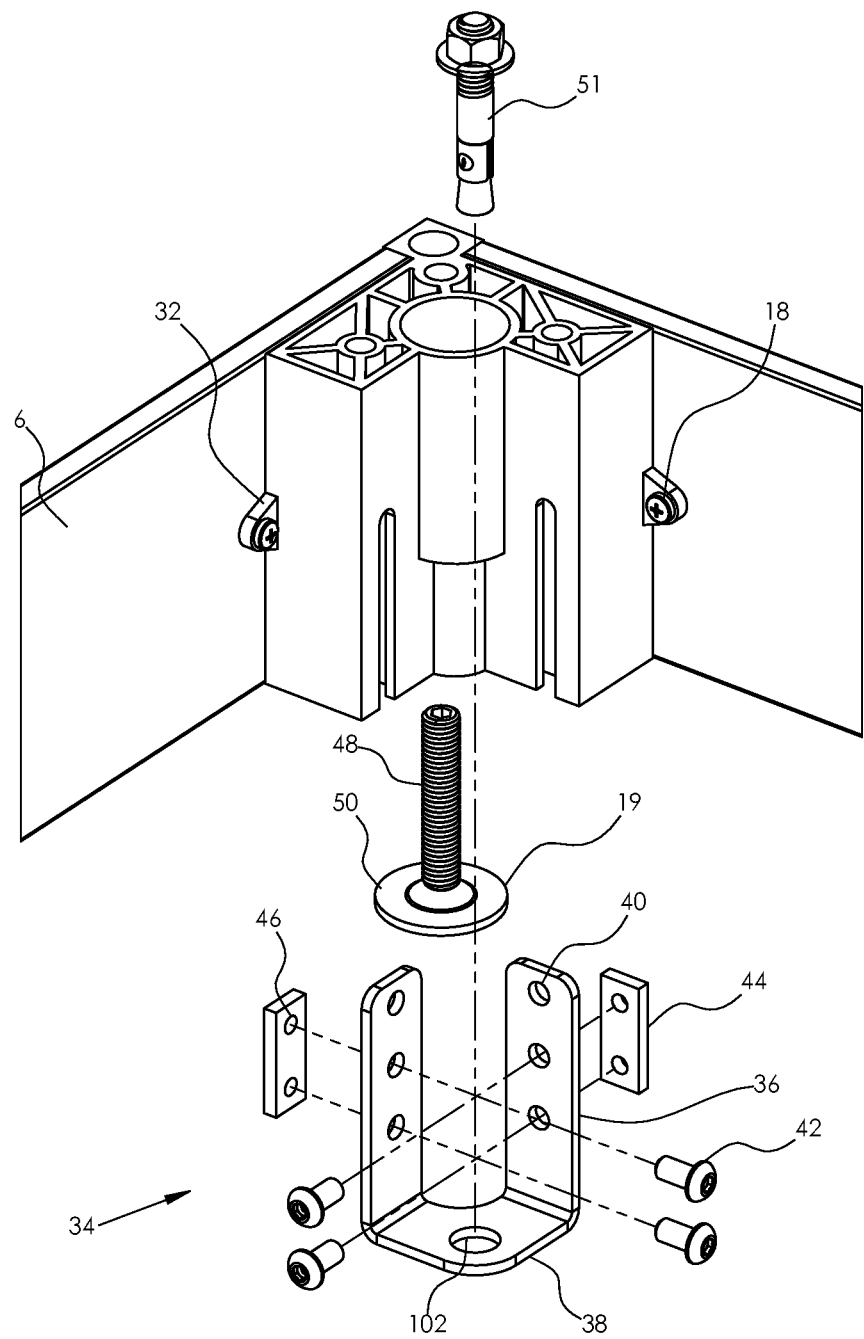
FIG. 7 is a perspective side assembly view of a squared toekick floor mount.
Figure 8:
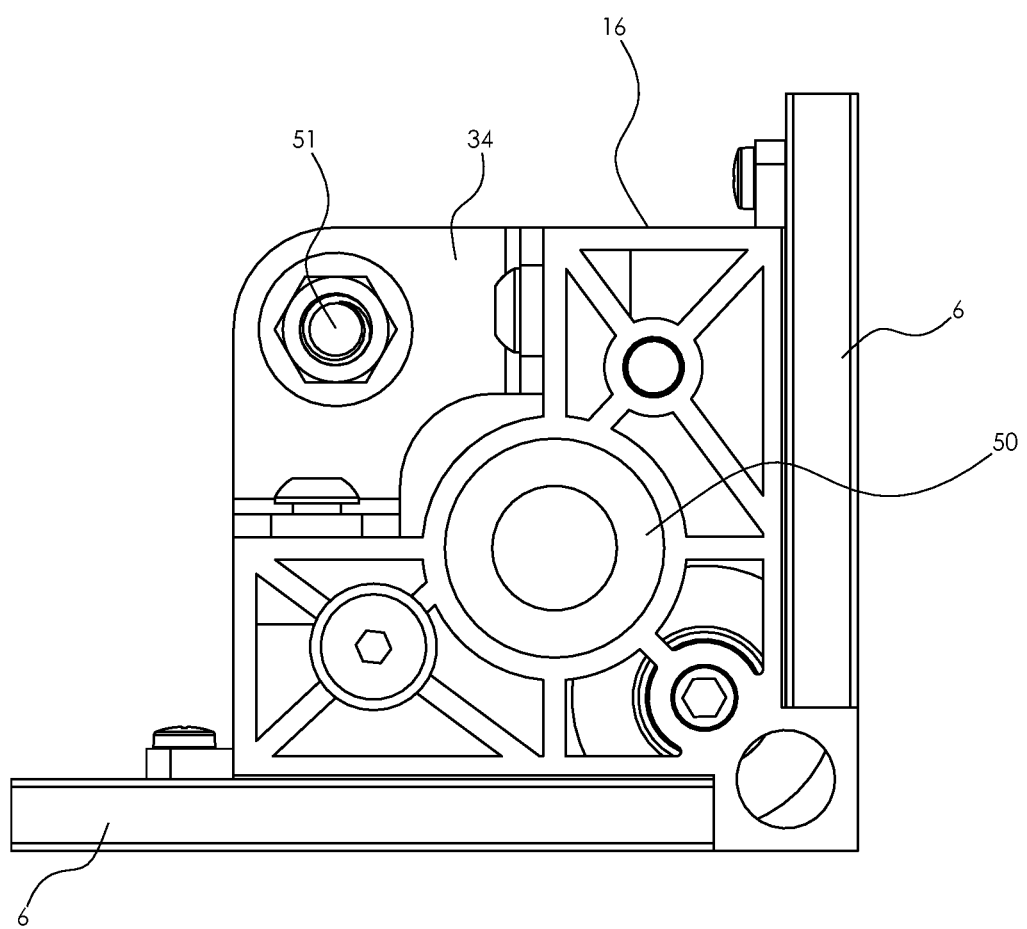
FIG. 8 is a bottom view of a squared toekick floor mount.
Figure 9:
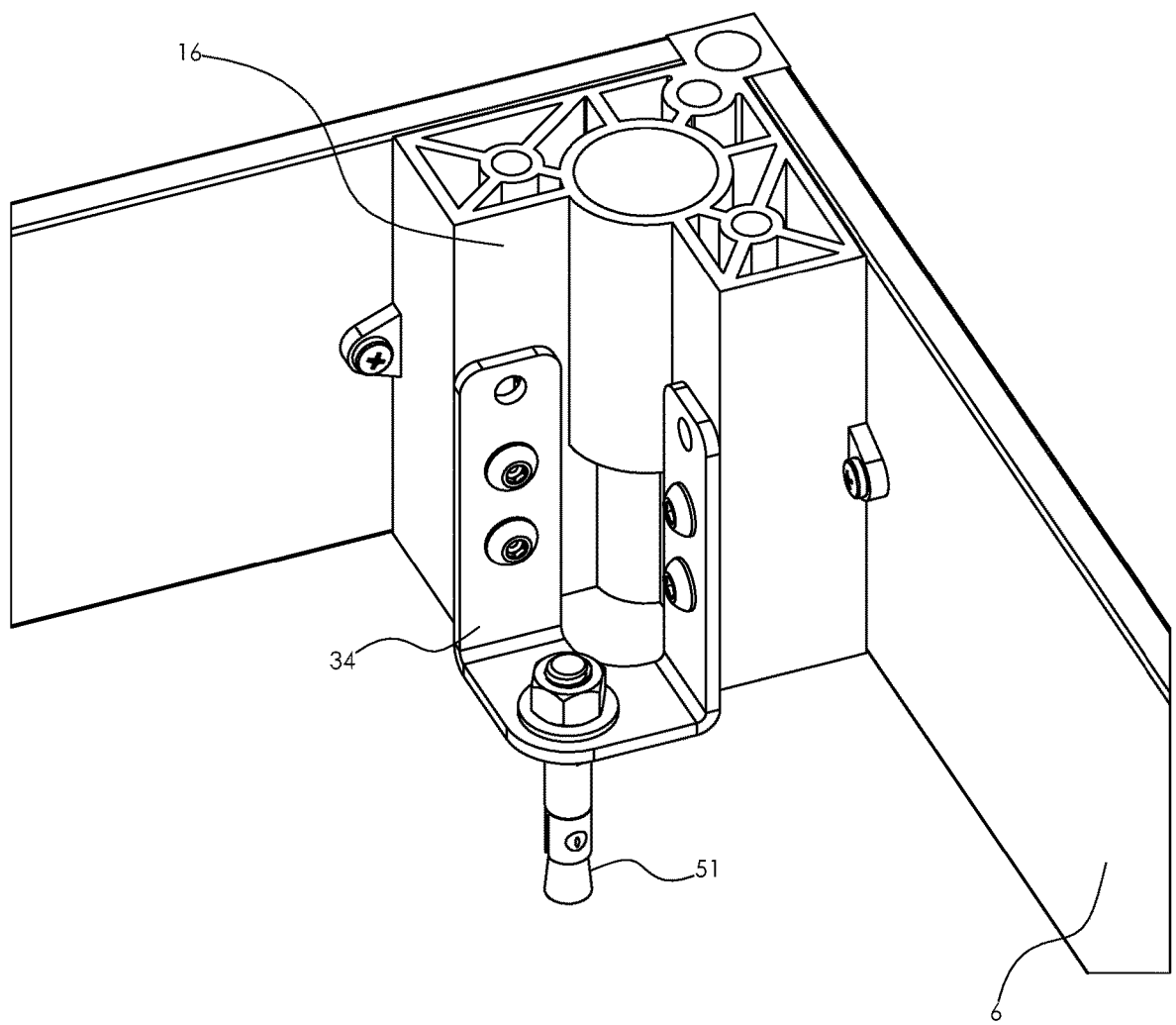
FIG. 9 is an enlarged view of section A of FIG. 1.

The second component of the squared toekick floor mount 2 is the squared seismic bracket 34 which is best illustrated in FIGS. 7 and 9. This is a metal U shaped bracket having two identical planar, rectangular arms 36 held in a spaced configuration by a 90 degree base 38 such that the planar faces of the arms 36 are perpendicular. Each of the arms 36 have a series of orifices 40 formed therethrough for the passage of a threaded connector 42. The base 38 has a mounting orifice 102 therethrough. There are two rectangular, planar connector plates 44 that have a series of threaded plate bores 46 matingly conformed with the threaded connectors 42.

In use (FIGS. 7-10) the cabinet is measured and the appropriate width and depth of the squared toekick floor mount 2 with the desired toekick space is determined. The squared toekick panels 6 are then cut into rectangular lengths taking into account the thickness of the corner sockets 24. The tabs 14 of the corner sockets 24 are inserted into the internal voids at the ends of the squared toekick floor mount panels 6 so as to frictionally engage the friction ridges 12. This will make a rectangular, squared toekick floor mount panel base which is further strengthened by the insertion of self drilling, self tapping screws 18 run through the screw tabs 32 into the inside faces of the squared toekick floor mount panels 6. This base is placed on the floor when the cabinet is to be mounted. The outer faces of four squared seismic brackets 34 are butted up against the inner faces of the squared leveling bracket 16 and are bolted to the floor by a suitable seismically approved mechanical floor fastener 51 that is appropriate to secure this assembly to the type of floor such as a screw, lag bolt, nail, rivet, cement anchor, or functional equivalent. The leveling foot 19 is rotated in the threaded cylindrical insert in the squared leveling bracket 16 until the squared toekick panels 6 are all level. The connector plates 44 are slid down into the hollow sides 22 and threadingly engaged with the threaded plate connectors 42 that are passed through the orifices 40 in the arms 36 of the squared seismic bracket 34 and the seismic bracket slot 30 in the side 22 of the squared leveling bracket 16. The cabinet 52 (FIG. 10) is placed on the squared toekick floor mount 2 and a series of machine screws 18 are used to connect the bottom of the cabinet 54 to the top edge of the squared toekick floor mount panels 6. (FIG. 10) These screws may also be run into screw thread inserts that are molded into the leveling bracket beside the threaded bore 20.

Figure 10:
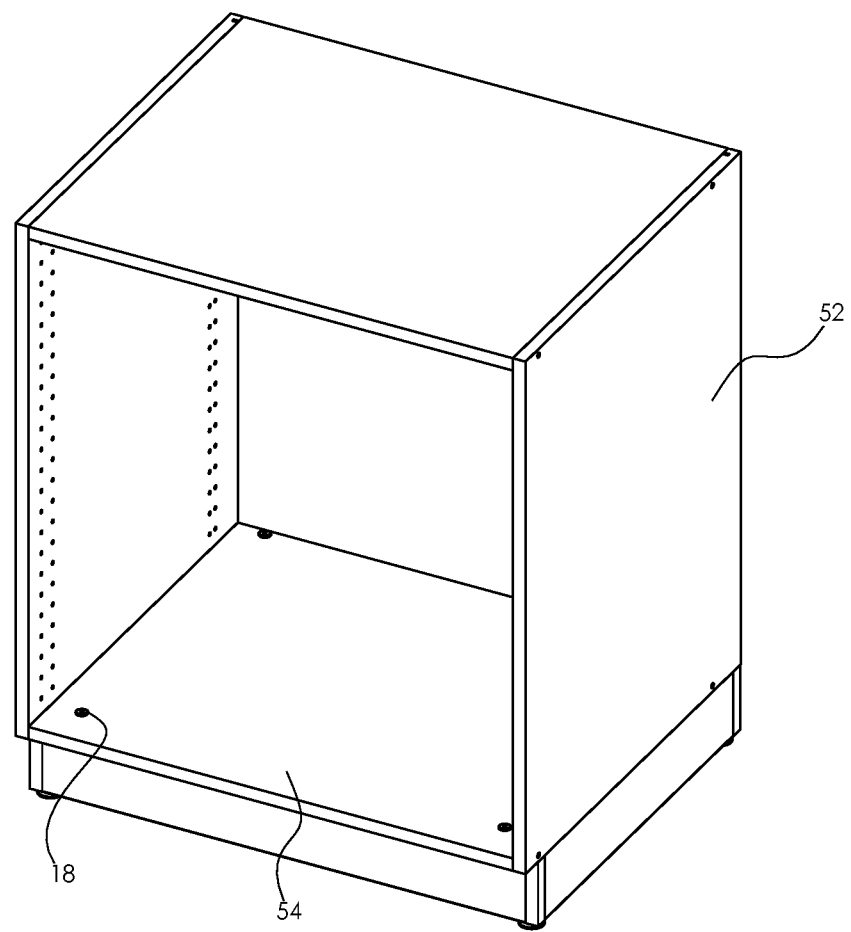
FIG. 10 is a side perspective view of a squared toekick floor mount mounted to a flat bottomed base (floor) cabinet.
Figure 11:
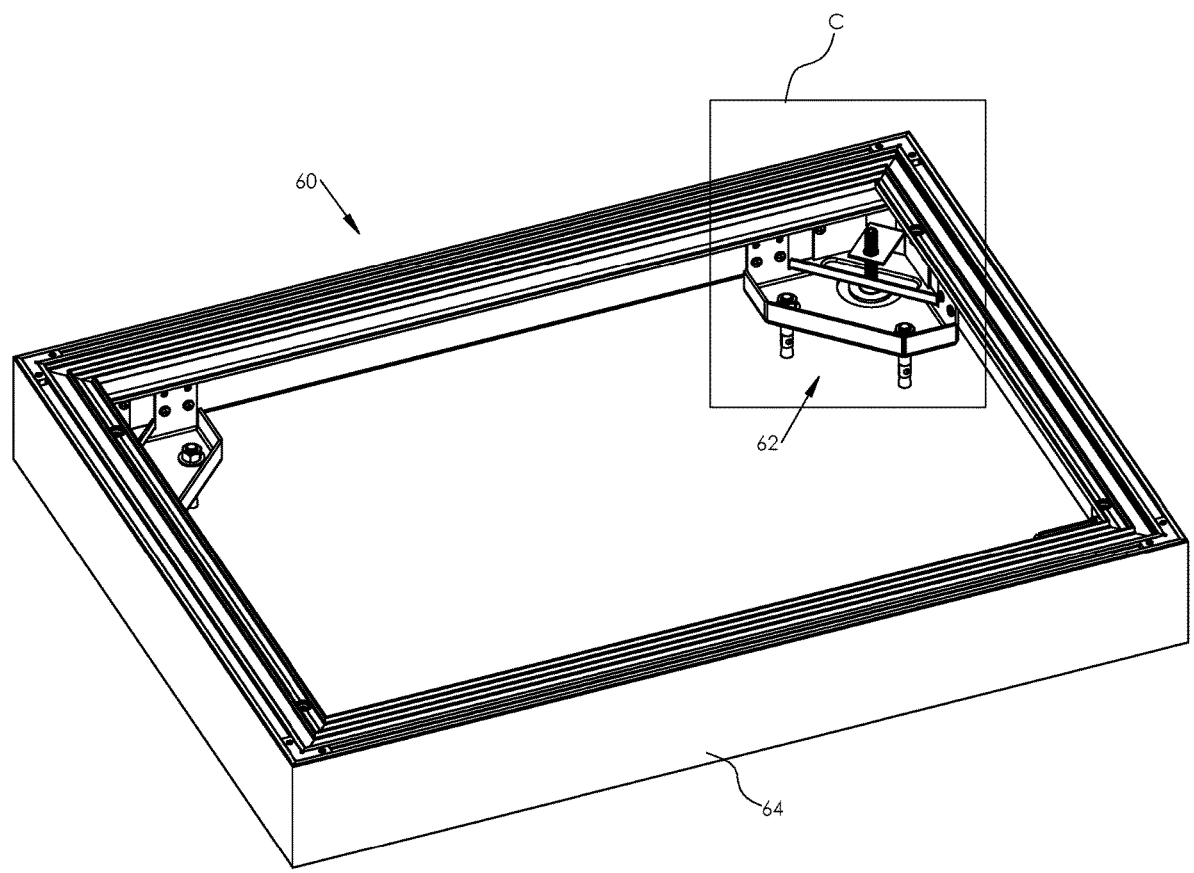
FIG. 11 is a side perspective view of the mitered toekick floor mount.
Figure 12:
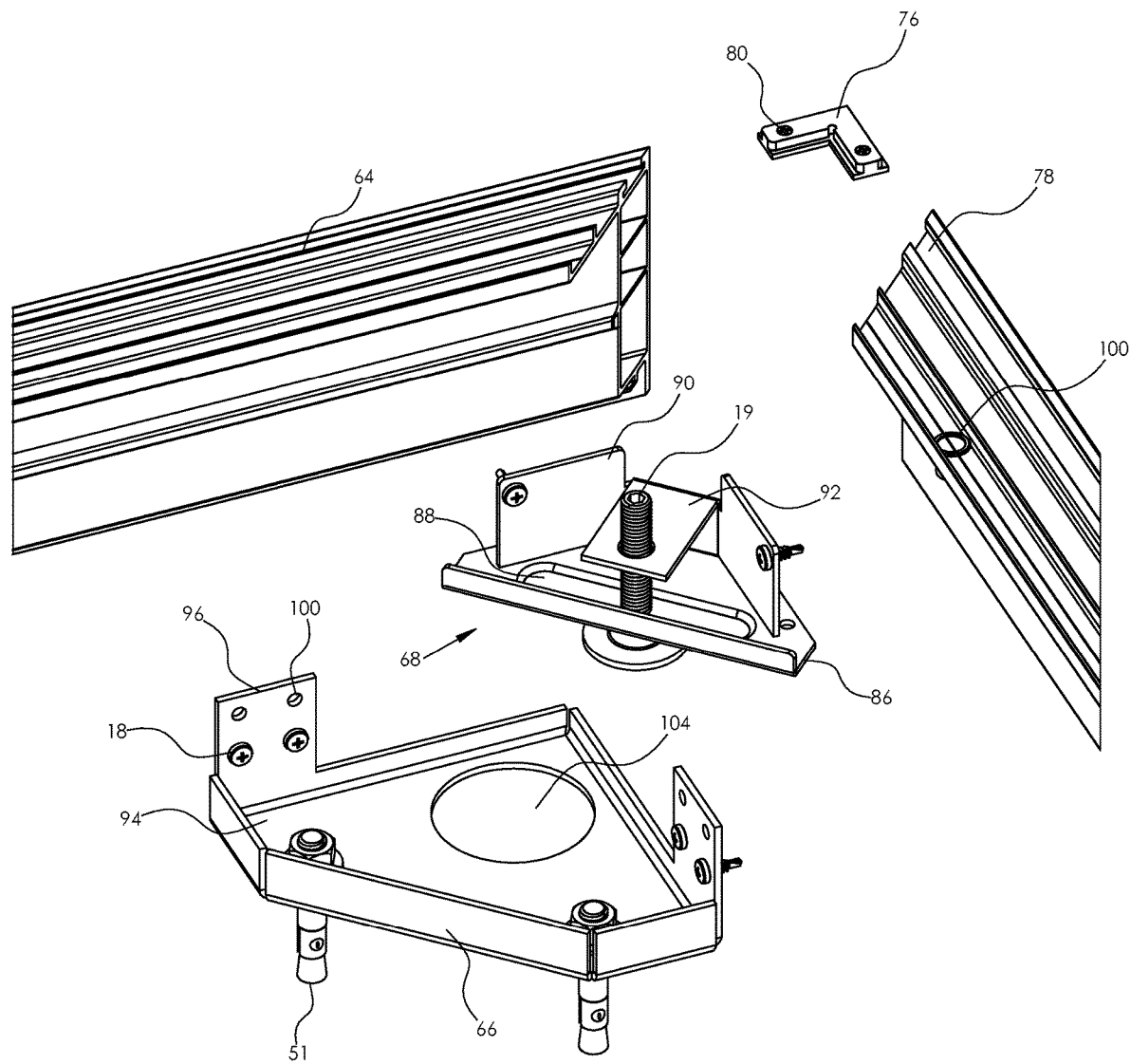
FIG. 12 is an enlarged, exploded view of the components in Section C of FIG. 11.
Figure 13:
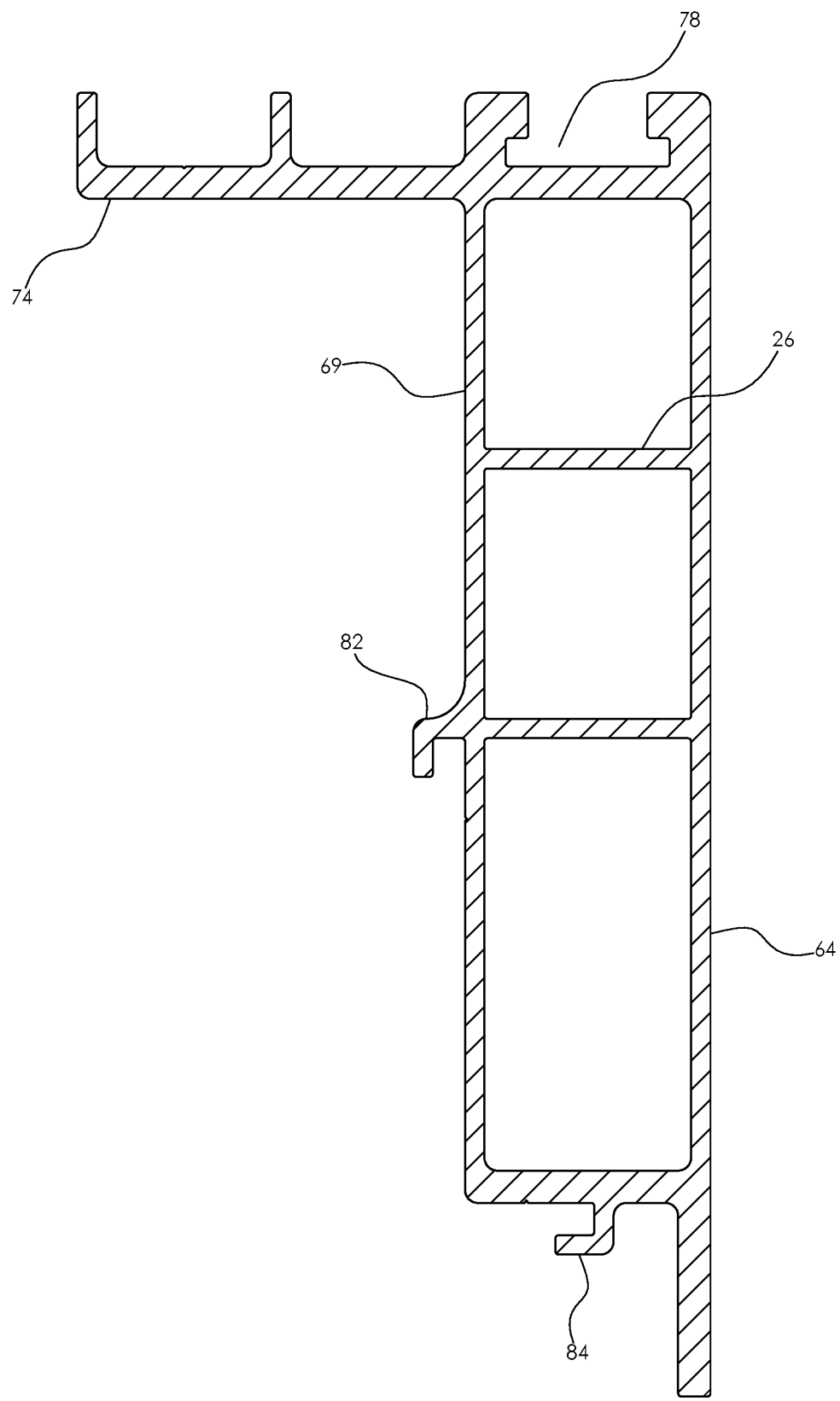
FIG. 13 is an end cross sectional view of the mitered toekick floor mount panel.

The squared leveling brackets 16 are now connected to the four squared toekick panels 6 to form a rectangular toekick floor mount panel base which is then leveled off of the floor. The squared leveling brackets 16, are connected to the squared seismic brackets 34 with mechanical connectors at the seismic bracket slot 30. The base cabinet 54 is screwed with self drilling, self tapping screws (or other suitable mechanical fasteners) through its bottom panel to the top edge of the squared panels 6. The components of the squared toekick floor mount 2 are now assembled into a single piece connected to the bottom face of the base cabinet 54, with the mechanical floor fastener 51 constraining vertical cabinet movement and the arms 36 of the squared seismic bracket 34 bearing against the squared leveling bracket 16 constraining the lateral movement of the cabinet. (FIG. 10)

Mitered Toekick Floor Mount

Looking now at FIGS. 11-15, it can be seen that the mitered toekick floor mount 60 has four identical corner assemblies 62 and four mitered cut toekick panels 64. The panels 64 must be cut into two pairs with each pair having two equal length panels. These panel lengths establish the width and depth of the cabinets. In the preferred embodiment the panels are made of aluminum, although other light, strong polymer, carbon fiber or composite material panels are also acceptable substitutes. Section C is illustrated in an enlarged format in FIG. 12. Just like the squared toekick floor mount 2, this floor mount is affixed with mechanical fasteners 18 (preferably with sell drilling, self tapping screws) to the bottom panel of a tall cabinet 70. (FIG. 15) The mitered toekick floor mount's corner assemblies 62 are also a two piece design with a mitered leveling bracket 68 and a mitered seismic bracket 66. The functional difference between the squared and mitered toekick floor mounts is that the mitered leveling bracket 68 and a mitered seismic bracket 66 do not connect to each other, rather, they both connect to the mitered cut toekick panels 64.

The mitered toekick floor mount panels 64 are planar, linear angle extrusions that are cut across their width at a 45 degree angle (or any other angle that matches the cabinet angles). The main body has a rectangular section 69 that is internally reinforced with webbing 26 that extends between the interior walls of the section 69. From the top of the rectangular section 69 is a T slot 78 from which perpendicularly extends a flange 74 that stabilizes the cabinet above, provides a broader surface to connect the cabinet bottom panel to and houses the leveling thread 100 to engage the leveling foot 19. The T slot serves as a channel to secure the miter top corner lock plate 76. Extending from the exterior face of the rectangular section 69 are an upper (vertical) L shaped, 90 degree linear rail 82 and a lower (horizontal) L shaped, 90 degree liner rail 84. Their linear openings reside perpendicular to each other. These linear rails 82/84 are used to support the mitered cut toekick panels 64 on the metered leveling bracket 68 for leveling purposes.

The miter top corner lock plate 76 is an L shaped plate with a rabbet formed about its top face. When the four mitered toekick floor mount panels 64 are joined, the miter top corner lock plate 76 (FIG. 12) is slid into the top T slot 78 with the leg of the rabbet engaged therein and the top of the mitered toekick floor mount panels 64 forced together at the top until the mitered edged abut one another on adjacent panels 64. Then mechanical fasteners are run through the mount holes 80 in the lock plate 76 into the bottom of the T slot 78 to retain the "no gap" corner look of the mitered panels 64.

The mitered leveling bracket 68 has a planar base plate 86 that has a linear slot 88 formed therethrough and two mounting arms 90 extending perpendicularly from its top face and with their planar faces perpendicular to each other. Each of the mounting arms 90 have screw orifices therthrough. The mounting arms 90 are not formed at the edge of the mitered leveling bracket's planar base plate 86, bit rather are inset an amount that allows the planar base plate 86 to engage in the Between the two mounting arms 90 is a leveler screw stabilizer 92. This is an L shaped arm extending perpendicularly from the top face of the mitered leveling bracket 68. It has a top plate parallel to the base plate 86 that has a leveler screw orifice slightly directly above the linear slot 88, that is larger than a diameter of the leveling foot 19. Inside of the linear slot 88 and passing through the leveler screw orifice resides the rotatable leveling foot 19. This rotatable leveling foot 19 is externally threaded and engages a leveling thread 100 in the perpendicular flange 74 of the mitered toekick floor mount panels 64. When rotated, the leveling foot 19 braces between the floor and the leveling thread 100 to raise the panels for leveling.

The mitered seismic bracket 66 is a flat plate 94 with two mounting ears 96 extending normally, vertically upward from two of its perpendicular, exterior edges. Each mounting ear 96 has attachment orifices 100 formed therethrough that allow the connection of the mitered seismic bracket 66 to the mitered toekick floor mount panels 64 via mechanical fasteners 18. Through the flat plate 94 are two mounting orifices to accommodate at least one mechanical floor fastener 51. There is also a central orifice 104 that allows the leveling foot 19 to pass through the mitred seismic bracket 66 and bear onto the floor for leveling purposes.

In assembly, the mitered corners are assembled as follow. The mitered panel's planar base plate 86 is slid into the lower (horizontal) 90 degree liner rails 84 and the two mounting arms 90 are slid into the upper (vertical) 90 degree linear rails 82 of the mitered toekick floor mount panels 64 and the panels 64 brought together at 90 degrees to form a corner. The miter top corner lock plate 76 is installed and its mechanical connectors are installed. The leveling foot 19 is threadingly engaged in the leveling thread 100 and the mitered seismic bracket 66 is placed below the mitered leveling bracket 68 with the leveling foot 19 passing through the central orifice 104 to the floor. The mitered toekick floor mount panels 64 leveled by leveling foot 19 rotation. Once level, mechanical fasteners 18 are used to connect the mounting arms 90 to the inside walls of the mitered toekick floor mount panels 64. The mechanical floor fasteners 51 are used to connect the mitered seismic bracket 66 to the floor and the mechanical fasteners 18 used to connect the mitered seismic bracket 66 to the inside wall of the mitered toekick floor mount panels 64. Lastly, the cabinet 70 is mounted to the top edge of the perpendicular flange 74 with mechanical fasteners 18.

In this design, the seismic mount is directly connected to the mitered toekick floor mount panels 64 not indirectly as in the squared toekick floor mount.

Figure 14:
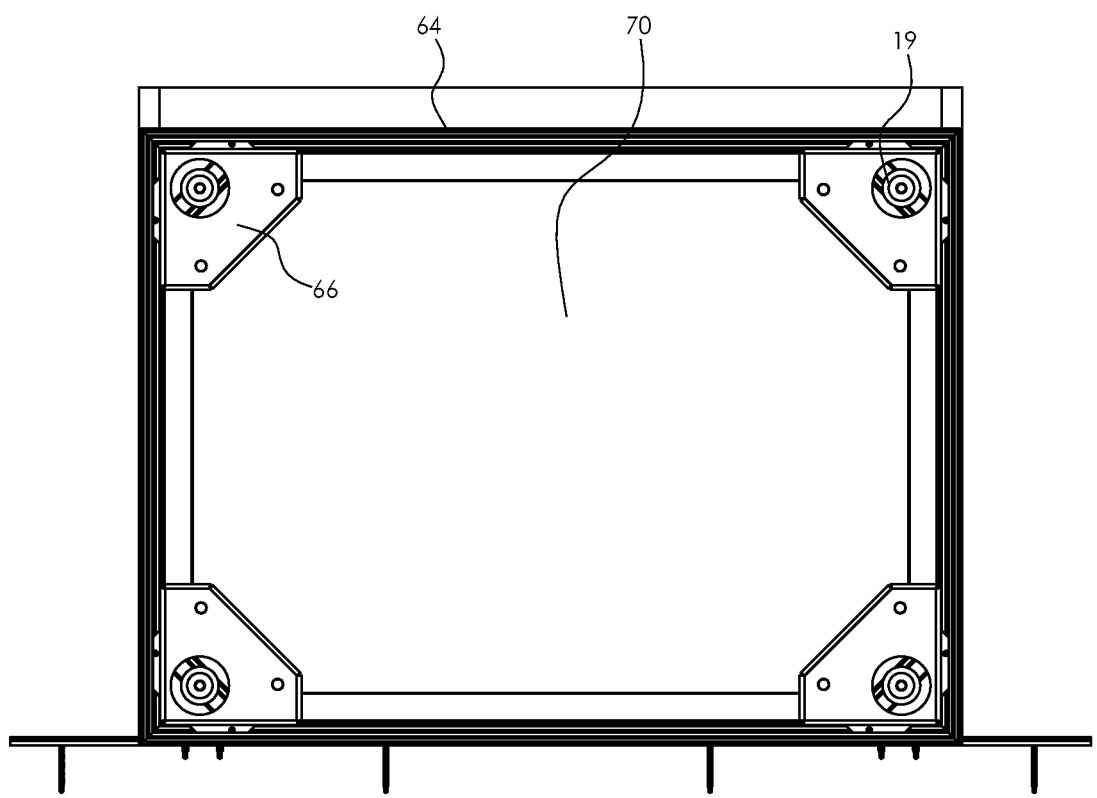
FIG. 14 is a bottom view of the mitered toekick floor mount.
Figure 15:
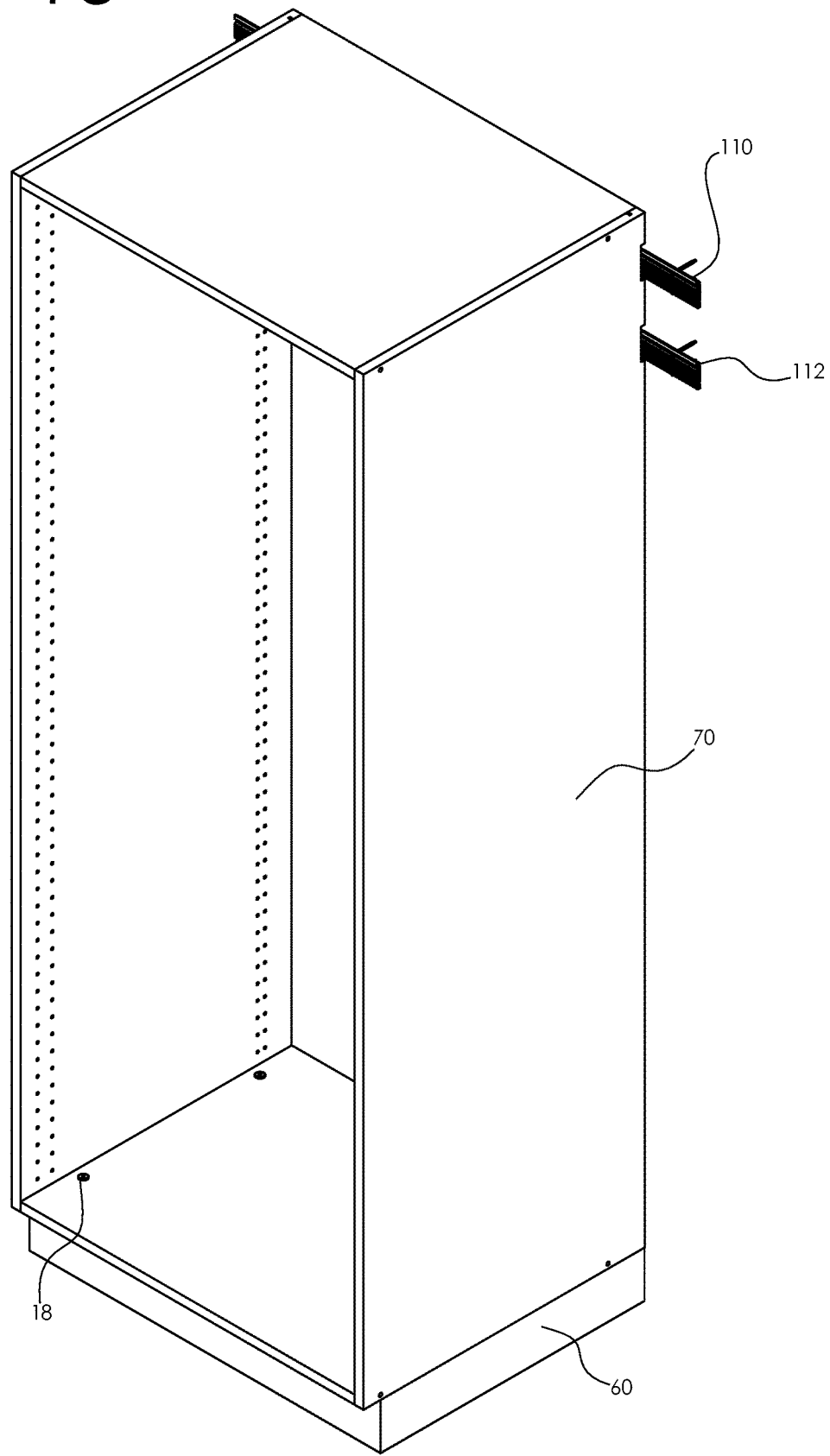
FIG. 15 is a tall cabinet attached atop a mitered toekick floor mount.

Looking at FIG. 14 the location of the components as installed on a floor can best be seen.

Upper and Lower Wall Mounts

Figure 16:
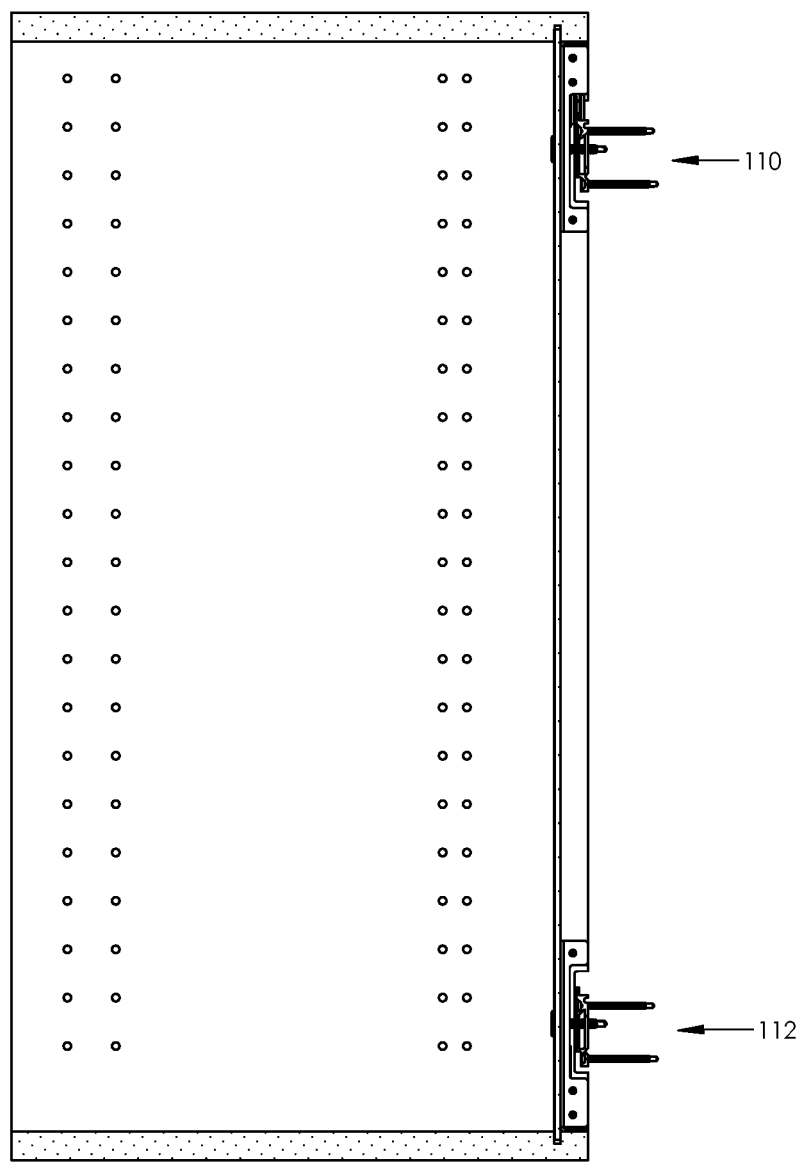
FIG. 16 is a section view of an upper cabinet with the upper and lower wall mounts affixed thereto.
Figure 17:
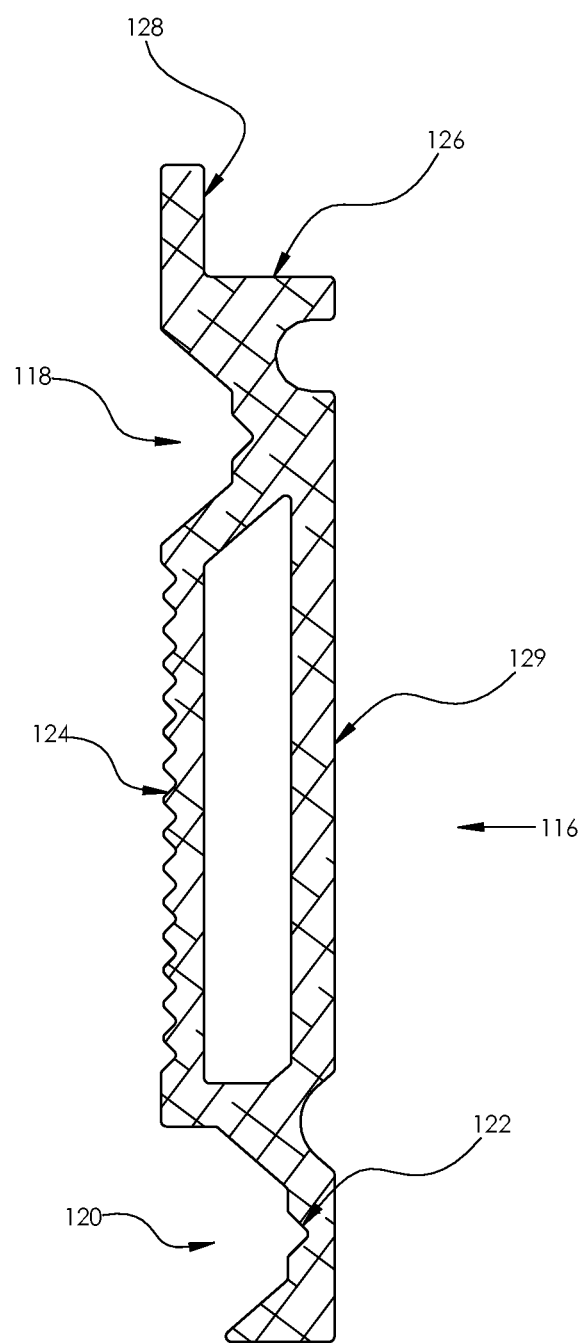
FIG. 17 is an end view of a wall rail.
Figure 18:
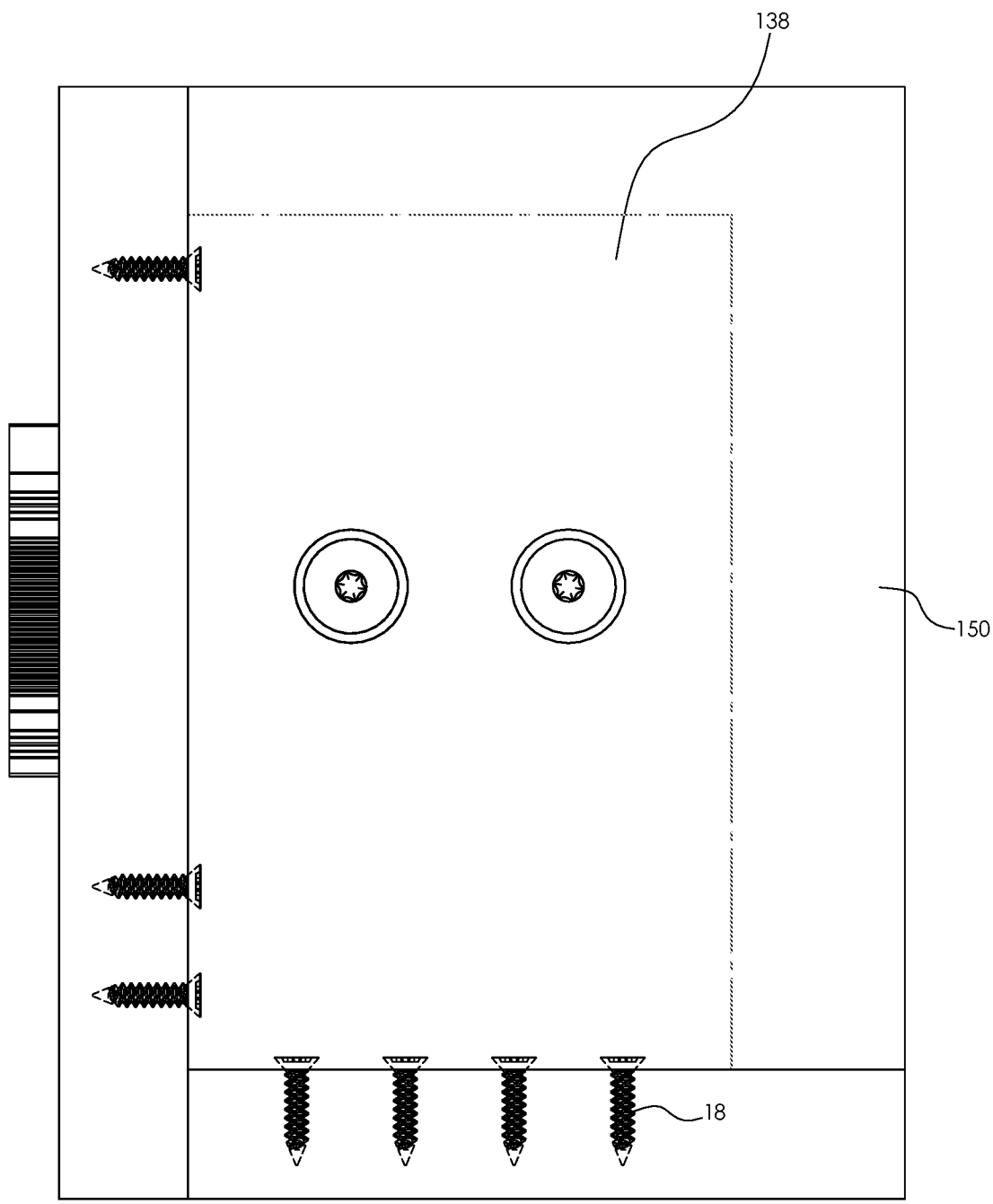
FIG. 18 is a front view of a lower corner mounting bracket.
Figure 23:
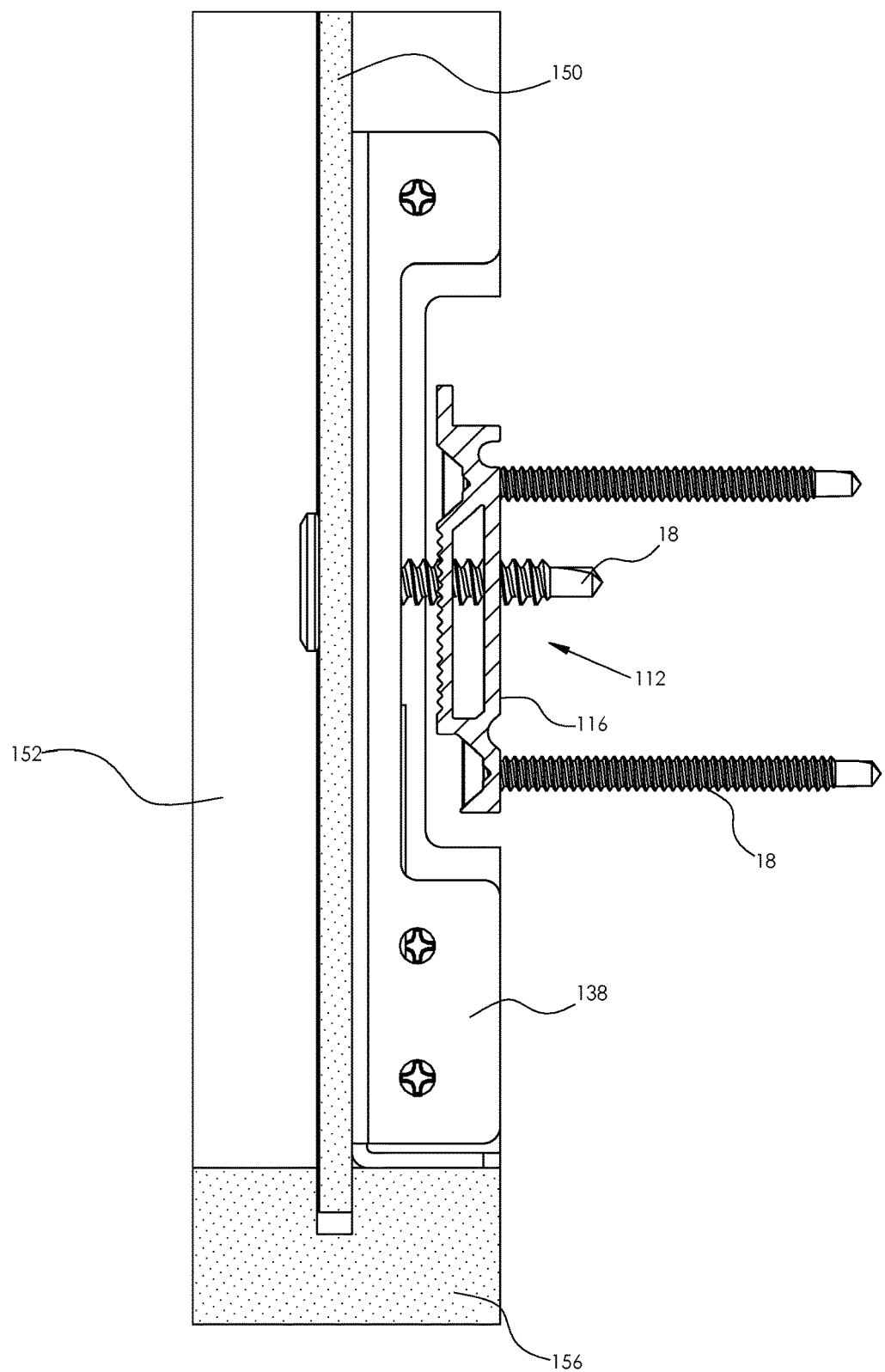
FIG. 23 is a side cross sectional view of a lower corner mounting bracket.
Figure 24:
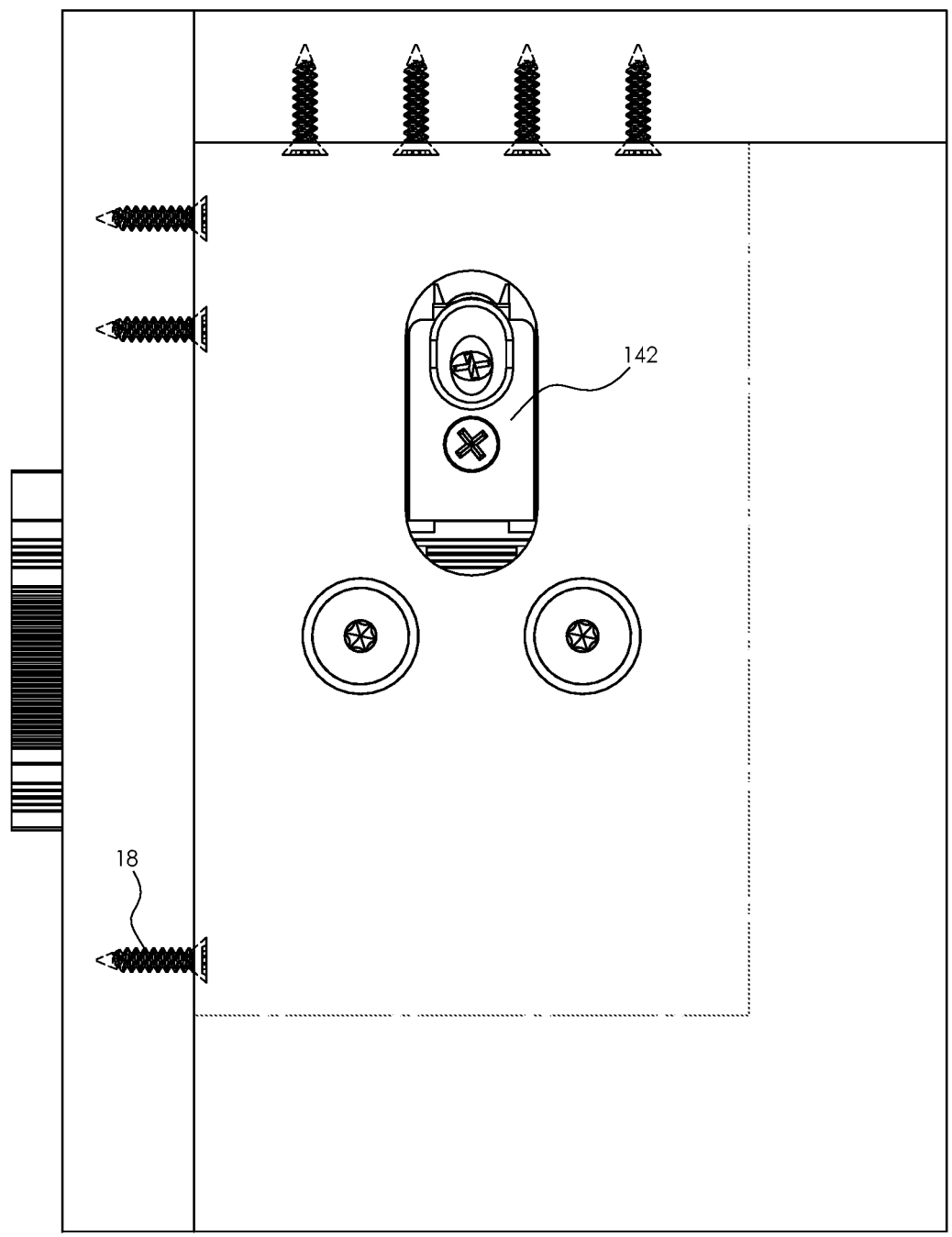
FIG. 24 is a front view of an upper corner mounting bracket.
Figure 29:
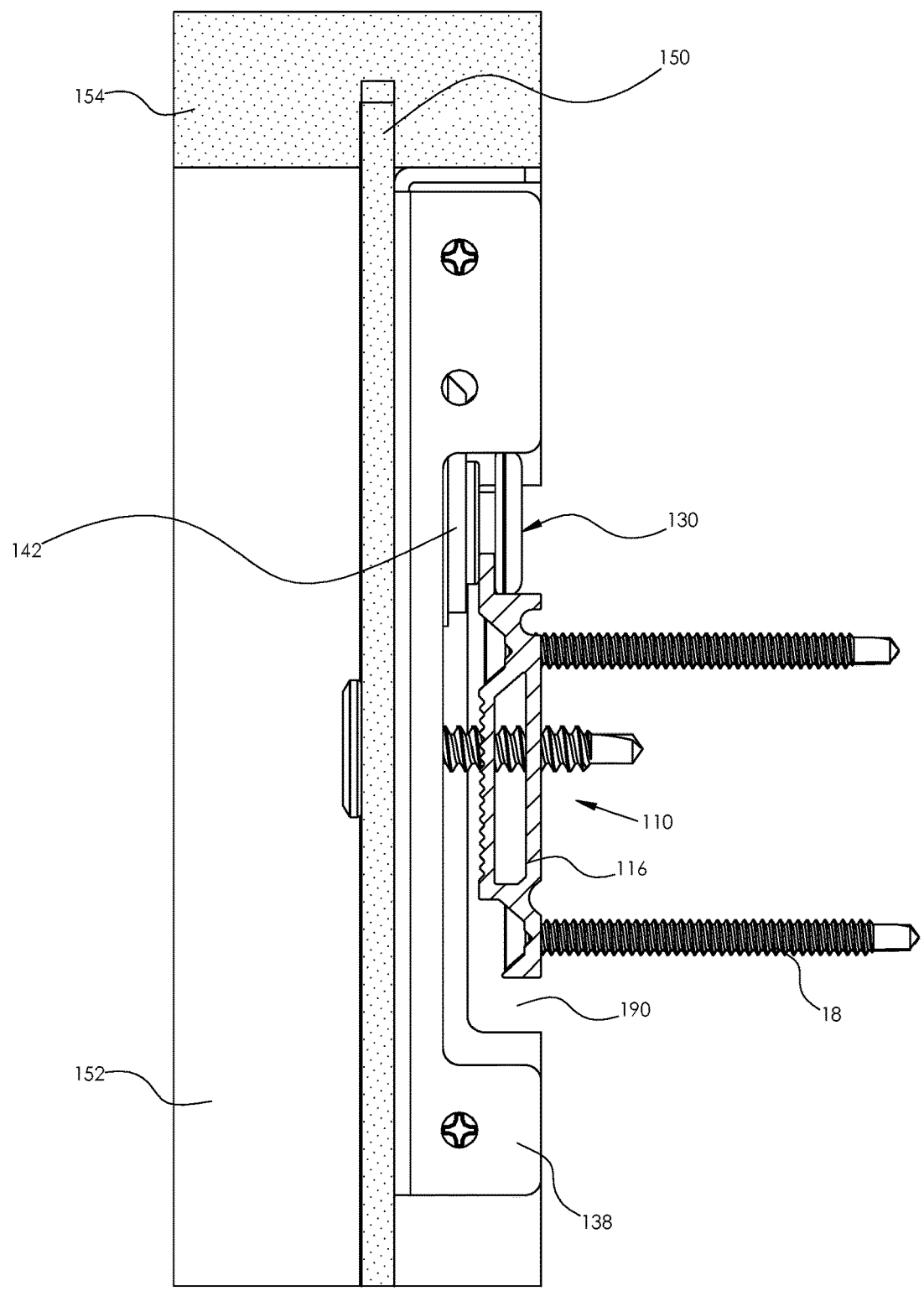
FIG. 29 is a side cross sectional view of an upper corner mounting bracket.
Figure 31:
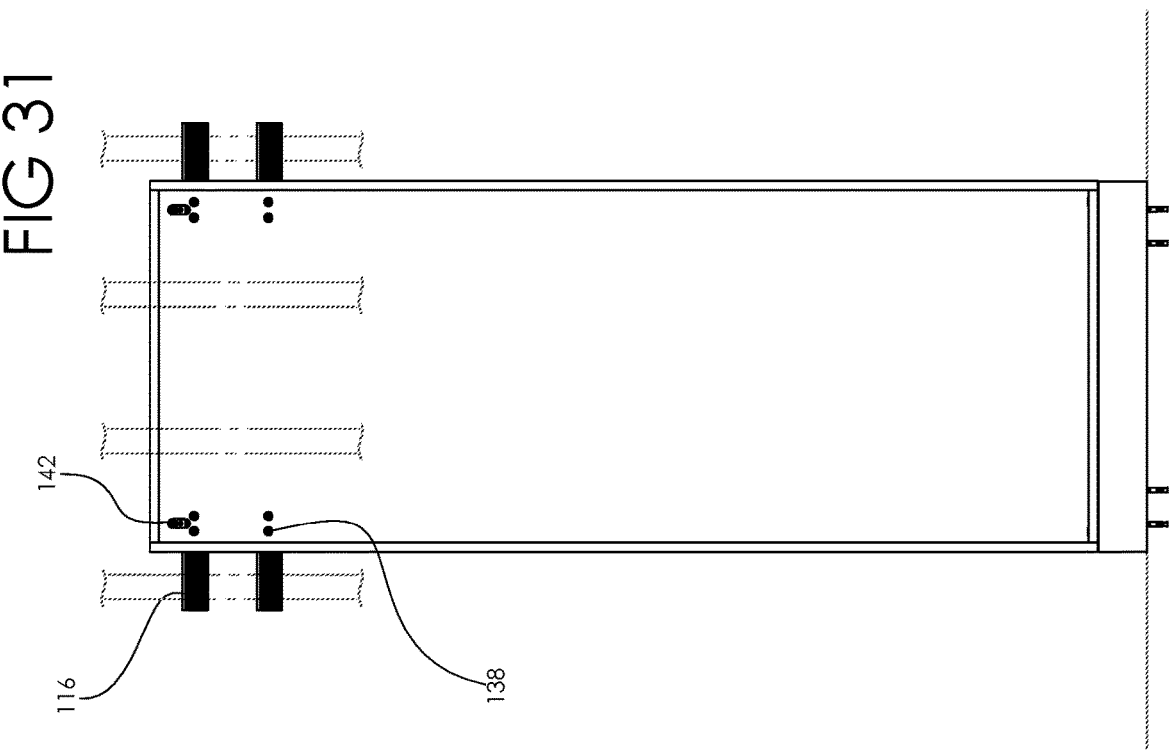
FIG. 31 is a front view of an installed tall cabinet.
Figure 30:
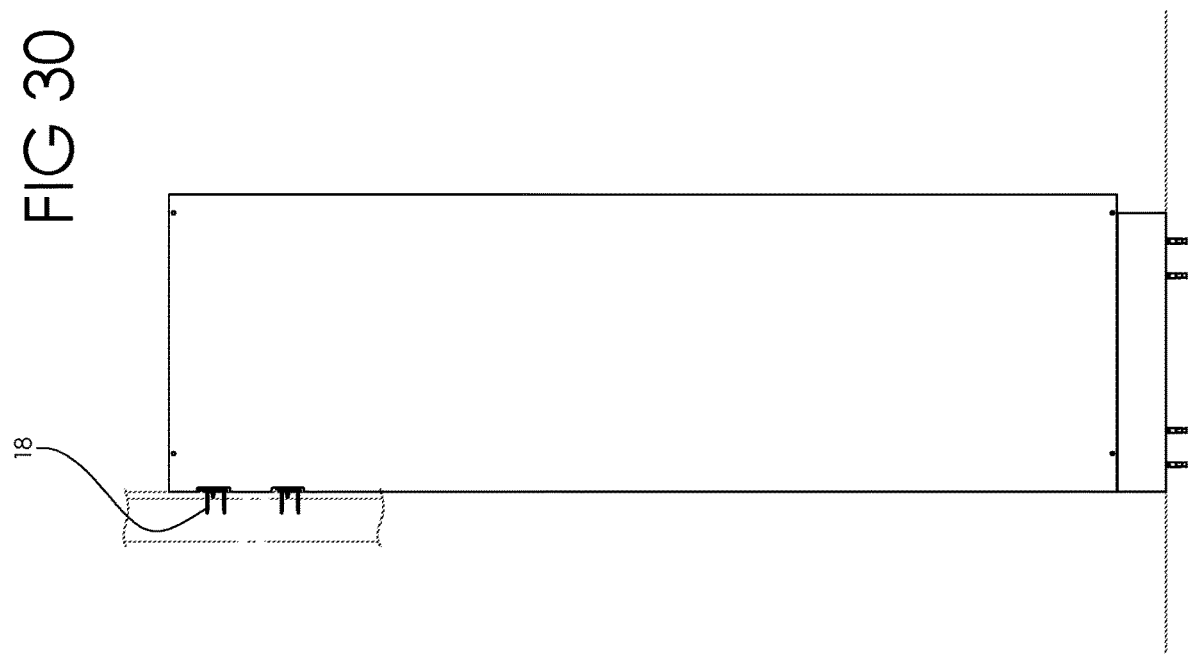
FIG. 30 is a side view of an installed tall cabinet.
Figure 32:
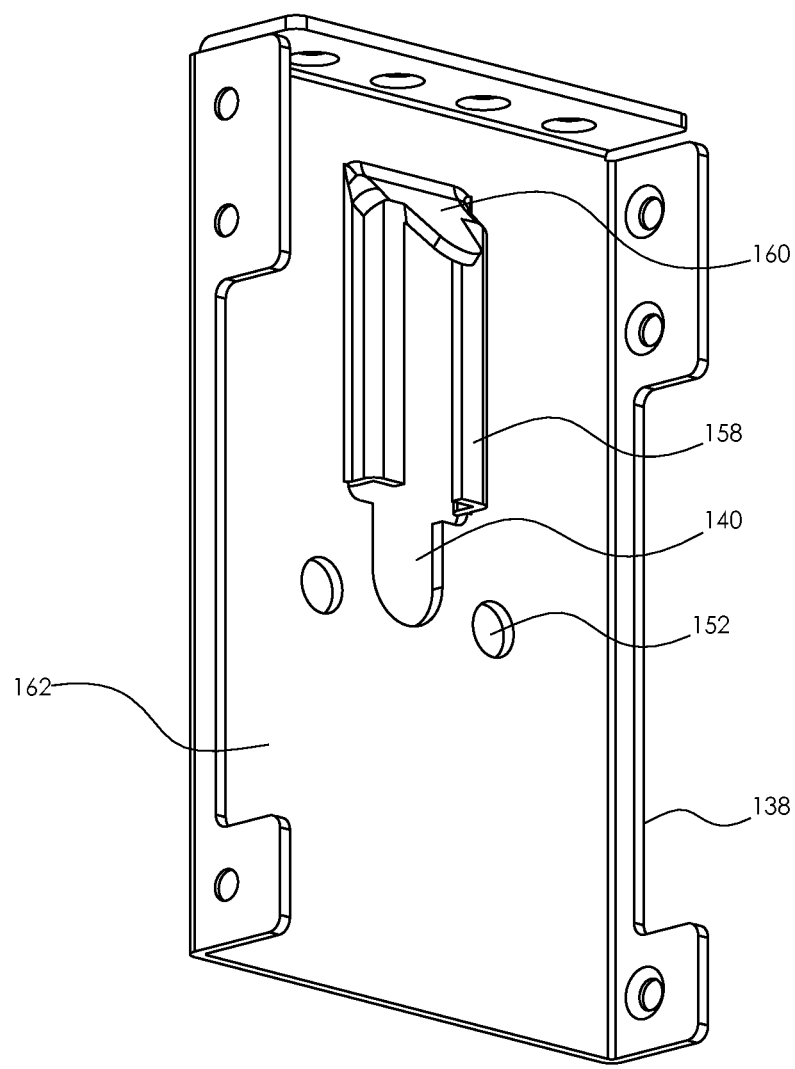
FIG. 32 is a perspective rear view of a corner mounting bracket.
Figure 33:
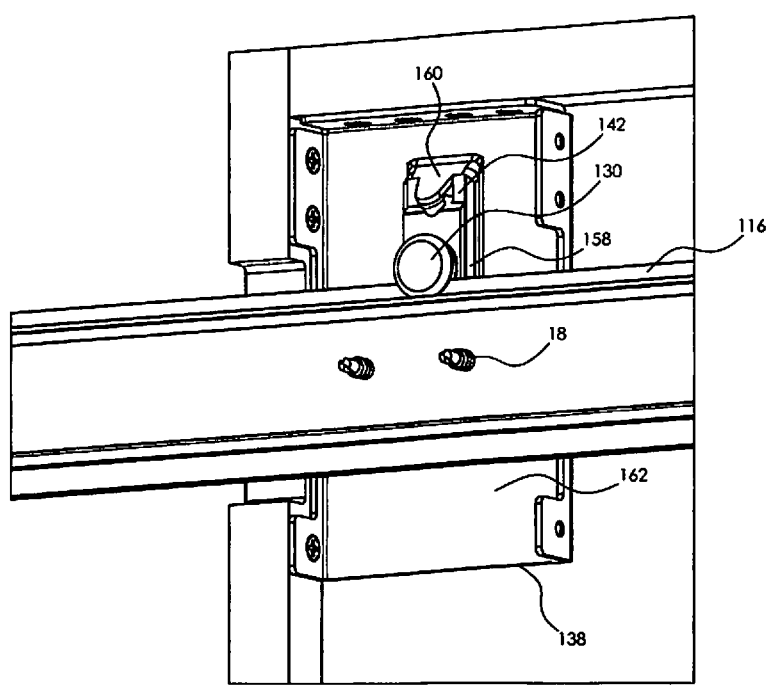
FIG. 33 is a perspective rear view of an upper corner mounting bracket in a cabinet, installed on a mounting rail.

Looking at FIGS. 16, 30 and 31 the location of the upper wall mount 110 (FIG. 29) and the lower wall mount 112 (FIG. 23) can be seen typically spaced for an upper cabinet and a tall cabinet 70. Spacing between the upper and lower wall mounts varies with the vertical dimensions of the cabinet. The two wall mounts 110 and 112 have a common mounting rail 116 (FIG. 17), a common mounting bracket 138 (FIGS. 19-21 and 32), a vertical and horizontal adjusting insert 142 (FIGS. 32, 33 and 34) and the mechanical fasteners 18 (FIGS. 23 and 29) used to attach the mounting rails 116 to the wall and the mounting brackets 138 to the mounting rails 116. With this system the cabinet can be hung, leveled vertically and leveled horizontally both from the wall and along the wall and secured to seismic qualification standards. Stated in other terms the cabinet, when installed on the rails, may be moved along all three axis (the X-Y axis, the X-Z axis and the Y-Z axis) prior to final securement to the wall.

In the preferred embodiment, the common mounting rail 116 is a double walled, hollow, planar, linear aluminum extrusion. It has an upper screw head channel 118 and a parallel lower screw head channel 120 formed along the length of its front face. Each are concave recesses conformed to matingly accept the head of the mounting screw. Centered in these recesses are screw starting points 122 that accept the tips of the screws and constrains them there while they are screwed into the mounting rail 116. These mounting rails were designed for use with self drilling screws and the screw starting points keep the drill point of the screw from drifting as they are screwed in. The mounting rail 116 has a toothed back face that contacts the cabinet back and a smooth front face 129 that contacts the wall. There is a planar, horizontal edge 126 at the top of the mounting rail 116 that has a flange 128 extending normally, vertically upward therefrom. This horizontal edge 126 and flange serve as both a surface to support the vertical load of the cabinet from the mounting button 130 and to prevent the cabinet from dislodging from off of the mounting rails 116 while the cabinet is being adjusted vertically and horizontally prior to the installation of the mechanical fasteners 18 that connect the mounting bracket 138 to the mounting rails 116.

Looking at FIGS. 18-23 (the lower corner mounting bracket) and FIGS. 24-28 (the upper corner mounting bracket) it can be seen that while the upper wall mount 110 and the lower wall mount 112 use the same mounting rails 116 and mounting bracket 138, the upper corner mounting bracket also has an adjustment insert 142 that is slidingly mounted into the adjustment slot 140 centrally located on the mounting bracket 38. This is because the upper corner mounting brackets used with the upper wall mount 110 are what accomplish the vertical and horizontal leveling feature of the cabinet whereas the lower corner mounting bracket does not.

Figure 34:
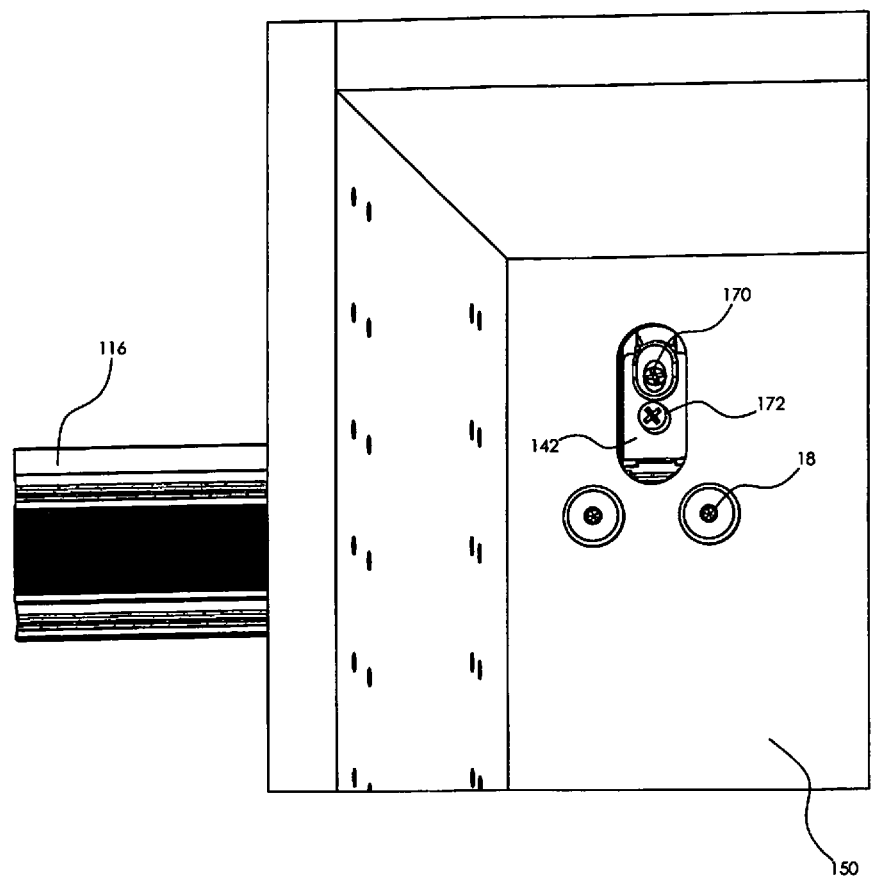
FIG. 34 is a perspective front view of a cabinet with an upper corner mounting bracket installed.

One of the most significant features of the corner mounting brackets 138 is that they are rectangular plates with perpendicular edge flanges 144 extending from at least three of the side edges of the planar front face 146. There are cabinet screw orifices 148 formed therethrough the edge flanges 144 and rail screw orifices 153 formed through the front face 146. These are to accommodate the mechanical fasteners 18 that connect the corner mounting brackets 138 to the two cabinet panels that intersect at the four corners of the cabinet and the mechanical fasteners 18 that connect the mounting bracket 138 to the rails 116. The cabinet back panel 150 has openings cut therethrough to allow access to the adjustment insert 140 and the rail screw orifices 153. (FIG. 34)

Centrally located within the corner mounting bracket 138 is an adjustment slot 140. It is an opening with two parallel L shaped adjustment guides 158 extending from the inner side edges of the adjustment slot 140 to the rear, parallel and in the same direction as the edge flanges 144 on the longitudinal edges of the corner mounting bracket 138. Along the top edge of the adjustment slot 140 is a vertical adjustment tab 160 that extends at approximately 45 degrees from the plane of the rear face 162 of the corner mounting bracket 138. These adjustment guides 158 allow the vertical sliding engagement of the adjustment insert 142 within the corner mounting bracket 138.

It is to be noted the corner mounting brackets have their rail mounting orifices lying along the lateral centerline of the brackets. The brackets 116 are invertable for use. The corner mounting bracket 116 has only three side flanges 144 so the corner mounting brackets used at the top corners of the upper cabinet are designed to be rotated 180 degrees for use in the bottom corners of the upper cabinet. This feature reduces fabrication costs.

The adjustment insert 142 is best illustrated in FIGS. 24, 25, 27, 28, 29 and 33. It is a steel, generally rectangular block with an upper angled threaded bore 164, and a lower threaded bore 166 that resides perpendicular to the plane of the block. The threads 164 and 166 may be formed directly into the adjustment insert 142 or may be formed into a threaded insert that is permanently affixed into the block. The linear sides of the adjustment insert 142 each have an adjustment groove 168 formed along their entire length that slidingly engage the two adjustment guides 158 on the corner mounting bracket 116. This allows the adjustment insert 142 to move vertically within the corner mounting bracket 138 when the cabinet is being leveled.

Into the upper angled threaded bore 164 is a vertical adjustment screw 170 and into the lower threaded bore 166, a depth adjustment screw 172 is threadingly engaged. The depth adjustment screw 172 is part of a mounting button 130 consisting of the depth adjustment screw 172 with an adjusting outer disk 180 and an inner disk 182 extending radially and perpendicularly therefrom and held in a parallel configuration on the shaft of the depth adjustment screw 172 so as to form a mounting groove 184 between the outer and inner disks 180 and 182. The width of this mounting groove is the approximate thickness of the flange 128 on the mounting rails 116.

These corner mounting brackets 138 are mounted behind the front face of the cabinet's back panel 150 at the four interior corners of the cabinet. (FIG. 34) The upper corner mounting brackets are each screwed into one side panel 152 (the left and right sides) and the top panel 154. The lower corner mounting brackets are each screwed into one side panel 152 (the left and right sides) and the bottom panel 156. (FIGS. 23 and 29) These corner mounting brackets 138 strengthen the connection between the cabinet's side panels 152 and the cabinet's top panel 154 or cabinet's bottom panels 156. With four corner brackets 138 utilized, the cabinet's carcass assembly is greatly strengthened so that it cannot come apart during a seismic event. It is to be noted that the upper and lower wall mounts 110 and 112, although located behind the face of the cabinet's back panel 150, only support the cabinet by the side, top and bottom panels 152, 154 and 156 of the cabinet—not the back panel 150. There is no load carried by the back panel of the cabinets in the present design.

With the mounting rails 116 attached to the studs behind the wall (or attached as otherwise applicable based on the wall construction), the four corner mounting brackets 138 attached to the corners of the cabinet, the depth adjustment screw 172 threadingly engaged in the lower threaded bore 166 of the adjustment insert 142, and the adjustment insert slidingly engaged in the corner mounting mounting bracket 138, the cabinet may be hung from the topmost of the mounting rails 116 by placing the mounting groove 184 of the button 130 on the flange 128. (FIG. 31) The cabinets can now be slid along the mounting rails 116 to the desired location. It is to be noted that the mounting rails 116 are intended to be installed as one piece across the wall and all of the cabinets hung on these two rails. To accommodate this there are rail dados 190 in the corner mounting brackets 138 and the cabinets side panels. There are finish caps used to conceal the rail dados on the visible sides of the cabinets.

With the cabinet hung, the cabinet can be leveled. When the vertical adjustment screw 170 is rotated inward, the end of this screw 170 abuts the vertical adjustment tab 160 on the corner mounting bracket 116, therein lifting the corner mounting bracket 116 and that corner of the cabinet up as the corner mounting bracket 116 slides up the adjustment guides 158. The weight of the cabinet is carried by the mounting button 130 on the mounting rail 116. The depth adjustment screw 172 may now be rotated to change the distance of the mounting groove 184 from the back panel of the cabinet. When the correct vertical height and cabinet depth is reached, the mechanical fasteners 18 are used to connect the corner mounting brackets 138 to the two mounting rails 116 for both the upper wall mount 110 and the lower wall mount 112. The weight of the cabinet is now carried by the button 130 and the mechanical fasteners 18 to both the mounting rails 116 and the wall.

The upper or tall cabinet carcasses are now connected to the walls in a secure manner that reinforces the construction of the cabinet carcass and carries the weight of the individual side top and bottom panels of the cabinet onto the wall framing members, constraining the upper cabinets from motion in the vertical and both horizontal planes. When used in conjunction with either of the styles of floor mounts, (FIG. 30) the cabinets are secure from dislodging from their locations in the event of an earthquake, short of the in place decoupling of the cabinet's panels.

While certain features and aspects have been described with respect to exemplary embodiments, one skilled in the art will recognize that numerous modifications are possible. Moreover, while the procedures of the methods and processes for building, assembling and using the devices described herein are described in a particular order for ease of description, unless the context dictates otherwise, various procedures may be reordered, added, and/or omitted in accordance with various embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A set of cabinet mounts to seismically attach a lower cabinet and an upper cabinet to a floor and wall of a building, comprising:
    a series of mechanical fasteners selected from the group consisting of nuts and bolts, screws, cap screws, machine screws, self-tapping screws, self-drilling screws, studs, setscrews, nails, rivets, cross dowel joiners, pins, concrete anchors and concrete fasteners;
    a linear upper mounting rail attachable to said wall with at least two first mechanical fasteners selected from said series of mechanical fasteners;
    a linear lower mounting rail attachable to said wall with at least two second mechanical fasteners selected from said series of mechanical fasteners;
        two lower corner mounting brackets having a planar body with at least three first side edge flanges extending perpendicularly therefrom and said first side flanges having first cabinet screw orifices formed therethrough, each of said lower corner mounting brackets attachable to an inside corner of said upper cabinet with at least two first mechanical fasteners selected from said series of mechanical fasteners passing through two of said first side flanges and into said upper cabinet, and said lower corner mounting brackets attachable to said lower mounting rail with at least one second mechanical fastener selected from said series of mechanical fasteners;
        two upper corner mounting brackets having a planar body with at least three second side flanges extending perpendicularly therefrom, and having second cabinet screw orifices formed therethrough, each of said upper corner mounting brackets attachable to an inside corner of said upper cabinet with at least two third mechanical fasteners from said series of mechanical fasteners passing through two of said second side flanges and into said upper cabinet, and said upper corner mounting brackets attachable to said linear upper mounting rail with at least one third mechanical fastener selected from said series of mechanical fasteners;
    a set of four planar, linear squared toekick panels;
    a set of four seismic brackets mountable to said floor;
    a set of four leveling brackets each leveling bracket connected to two of said set of four linear squared toekick panels so as to form a rectangle and connectable to one of said seismic brackets; and
    wherein said lower cabinet is connected to said four leveling brackets.

2. The set of cabinet mounts of claim 1 further comprising:
    a planar, horizontal upper edge on said upper mounting rail, said upper edge having a mounting rail flange extending perpendicularly and vertically therefrom; and
    wherein said upper mounting rail and said lower mounting rail are double walled, hollow, aluminum extrusions that have an upper screw head channel and a parallel lower screw head channel each channel with a screw starting points formed along their longitudinal centerlines and conformed to matingly accept a head of a screw.

3. The set of cabinet mounts of claim 2 further comprising:
    a pair of mounting orifices and an adjustment slot formed therethrough each of said two upper corner mounting brackets, said adjustment slot having two parallel L shaped adjustment guides extending from inner vertical side edges of said adjustment slot;
    a pair of vertical and horizontal adjusting inserts each a planar rectangular block with at least a first threaded bore therethrough and a pair of parallel adjustment grooves formed along their sides that slidingly engage said pair of adjustment guides on said upper corner mounting brackets;
    a pair of mounting buttons each made of a threaded depth adjustment screw with an outer disk and a parallel inner disk extending radially in a spaced and perpendicular configuration therefrom said threaded depth adjustment screw so as to form a mounting groove therebetween, each one of said pair of mounting buttons threadingly engaged with said first threaded bore on one of said pair of vertical and horizontal adjusting inserts; and
    wherein said mounting rail flanges are engageable in said mounting grooves and said threaded depth adjustment screws adjust a distance between said mounting grooves and said upper corner mounting brackets.

4. The set of cabinet mounts of claim 3 further comprising:
    a pair of second threaded bores one of each disposed at an upward angle in each of said pair vertical and horizontal adjusting inserts;
    a pair of vertical adjustment tabs, each one extending at an angle perpendicular to said second threaded bores; and
    a pair of vertical adjustment screws each one threadingly engaged in one of said pair of vertical and horizontal adjusting inserts and bearing against one of said pair of vertical adjustment tabs; and
    wherein said vertical adjustment screws are engageable in said second threaded bores to adjust a vertical distance of said upper corner mounting brackets from said pair of vertical and horizontal adjusting inserts.

5. The set of cabinet mounts of claim 1 wherein said squared toekick panels are planar, linear panels with a rectangular lateral cross section having two thin planar outer faces held in a parallel spaced configuration by a grid of spacer stiffening strips so as to form rectangular internal voids accessible at each end of said squared toekick panels; and
    wherein said leveling brackets each have an L configuration with identical perpendicular rectangular sides that connect at a square outer corner socket that extends from an outside corner, and a central right cylindrical bore housing a rotatable, vertically extendible leveling foot therein; and wherein there are a pair of seismic bracket slots formed there along an inner face of said rectangular sides; and wherein said outer corner socket has six rectangular panel tabs that extend therefrom and frictional engage in said rectangular internal voids in said squared toekick floor mount panels; and wherein each said seismic bracket has two identical planar, perpendicular arms with seismic bracket orifices formed therethrough that are held in a spaced configuration by a 90 degree base which has a floor mounting orifice therethrough; and a pair of rectangular, planar connector plates that have a series of threaded plate bores therethrough, said planar connector plates connectable to said seismic brackets with mechanical connectors passing through said seismic bracket orifices when said arms of said seismic bracket are engaged into said seismic bracket slots.

6. The set of cabinet mounts of claim 4 wherein said squared toekick panels are planar, linear panels with a rectangular lateral cross section having two thin planar outer faces held in a parallel spaced configuration by a grid of spacer stiffening strips so as to form rectangular internal voids accessible at each end of said squared toekick panels; and wherein said leveling brackets each have an L configuration with identical perpendicular rectangular sides that connect at a square outer corner socket that extends from an outside corner, and a central right cylindrical bore housing a rotatable, vertically extendible leveling foot therein, and a pair of screw tabs extending from said rectangular sides; and wherein there are a pair of seismic bracket slots formed there along an inner face of said rectangular sides; and wherein said outer corner socket has six rectangular panel tabs that extend therefrom and frictional engage in said rectangular internal voids in said squared toekick floor mount panels; and wherein each said seismic bracket has two identical planar, perpendicular arms with seismic bracket orifices formed therethrough that are held in a spaced configuration by a 90 degree base which has a floor mounting orifice therethrough; and a pair of rectangular, planar connector plates that have a series of threaded plate bores therethrough, said planar connector plates insertable in said rectangular sides and connectable to said seismic brackets with mechanical connectors passing through said seismic bracket orifices when said arms of said seismic bracket are engaged into said seismic bracket slots.

7. A set of cabinet mounts to seismically attach a lower cabinet and an upper cabinet to a floor and wall of a building, comprising:

a series of mechanical fasteners selected from the group consisting of nuts and bolts, screws, cap screws, machine screws, self-tapping screws, self-drilling screws, studs, setscrews, nails, rivets, cross dowel joiners, pins, concrete anchors and concrete fasteners;

a linear upper mounting rail attachable to said wall with at least two mechanical fasteners selected from said series of mechanical fasteners;

a linear lower mounting rail attachable to said wall with at least two mechanical fasteners selected from said series of mechanical fasteners;

two lower corner mounting brackets having a planar body with at least three first side edge flanges extending perpendicularly therefrom and said first side flanges having cabinet screw orifices formed therethrough, each of said lower corner mounting brackets attachable to an inside corner of said upper cabinet with at least two mechanical fasteners selected from said series of mechanical fasteners passing through two of said first side flanges and into said upper cabinet, and said lower corner mounting brackets attachable to said lower mounting rail with at least one mechanical fastener selected from said series of mechanical fasteners;

two upper corner mounting brackets having a planar body with at least three second side flanges extending perpendicularly therefrom, and having second cabinet screw orifices formed therethrough, each of said upper corner mounting brackets attachable to an inside corner of said upper cabinet with at least two mechanical fasteners from said series of mechanical fasteners passing through two of said second side flanges and into said upper cabinet, and said upper corner mounting brackets attachable to said upper mounting rail with at least one mechanical fastener selected from said series of mechanical fasteners;

a set of four planar, linear mitered toekick panels;

a set of four seismic brackets mountable to said floor and connected to two of said four planar linear mitered toekick panels so as to form a rectangle;

a set of four leveling brackets each said leveling bracket connected to two toekick panels in said rectangle; and wherein said lower cabinet is connected to said four leveling brackets.

8. The set of cabinet mounts of claim 7 further comprising:

a planar, horizontal upper edge on said upper mounting rail, said upper edge having a mounting rail flange extending perpendicularly and vertically therefrom; and wherein said upper mounting rail and said lower mounting rail are double walled, hollow, aluminum extrusions that have an upper screw head channel and a parallel lower screw head channel each channel with a screw starting points formed along their longitudinal centerlines and conformed to matingly accept the head of a screw.

9. The set of cabinet mounts of claim 8 further comprising:

a pair of mounting orifices and an adjustment slot formed therethrough each of said two upper corner mounting brackets, said adjustment slot having two parallel L shaped adjustment guides extending from inner vertical side edges of said adjustment slot;

a pair of vertical and horizontal adjusting inserts each a planar rectangular block with at least a first threaded bore therethrough and a pair of parallel adjustment grooves formed along their sides that slidingly engage said pair of adjustment guides on said upper corner mounting brackets;

a pair of mounting buttons each made of a threaded depth adjustment screw with an outer disk and a parallel inner disk extending radially in a spaced and perpendicular configuration therefrom said depth adjustment screw so as to form a mounting groove therebetween, each one of said pair of mounting buttons threadingly engaged with said first threaded bore on one of said pair of adjusting inserts; and wherein said mounting rail flanges are engageable in said mounting grooves and said depth adjustment screws adjust a distance between said mounting grooves and said upper corner mounting brackets.

10. The set of cabinet mounts of claim 9 further comprising:
a pair of second threaded bores one of each disposed at an upward angle in each of said pair vertical and horizontal adjusting inserts;
a pair of vertical adjustment tabs, each one extending at approximately 45 degrees from a rear face of one of said pair of corner mounting brackets; and
a pair of vertical adjustment screws each one threadingly engaged in one of said pair of adjusting inserts and bearing against one of said pair of vertical adjustment tabs; and
wherein said vertical adjustment screws are engageable in said second threaded bores to adjust a vertical distance of said upper corner mounting brackets from said vertical and horizontal adjusting inserts.

11. The set of cabinet mounts of claim 7 further comprising;
a miter top corner lock plate; and
wherein said mitered toekick panels are angle extrusions that are cut across their width at their ends at a 45 degree angle and have a main section, rectangular in cross section, that is internally reinforced and has a T slot formed on a top face from which a flange extends perpendicularly therefrom, said T slot retaining said mitered top corner lock plate, a straight flange extending from the outer corner of a bottom face of said mitered toekick panels, an upper L shaped rail on an interior face of said rectangular section and a lower L shaped rail on a bottom face of said main section; and
wherein said mitered leveling bracket has a planar base plate with a linear slot formed therethrough, two perpendicular mounting arms with bores therethrough, said mounting arms extending from a top face of said mitered leveling bracket, an L shaped leveler screw stabilizer extending from said top face of said mitered leveling bracket therebetween said two mounting arms having a top plate parallel to said base plate with a leveler screw orifice therethrough directly above said linear slot, and a rotatable leveling foot passing through said linear slot and said leveler screw orifice; and
wherein said leveling foot is externally threaded and engages a leveling thread in the straight flange of the mitered toekick panels for leveling;
a mitered seismic bracket made of a flat plate with exterior side lips extending therefrom where two of the side lips each have a mounting ears with attachment orifices formed therethrough, said mounting ears connecting the mitered seismic bracket to the mitered toekick floor mount panels via mechanical fasteners, two mounting orifices to accommodate a connection of one said mechanical fastener to said floor, and a central orifice that allows the leveling foot to pass through the mitred seismic bracket and bear onto a floor for leveling purposes.

12. The set of cabinet mounts of claim 10 further comprising:
a miter top corner lock plate; and
wherein said mitered toekick panels are angle extrusions that are cut across their width at their ends at a 45 degree angle and have a main section, rectangular in cross section, that is internally reinforced and has a T slot formed on a top face from which a flange extends perpendicularly therefrom, said T slot retaining said mitered top corner lock plate, a straight flange extending from the outer corner of a bottom face of said mitered toekick panels, an upper L shaped rail on an interior face of said rectangular section and a lower L shaped rail on a bottom face of said main section; and
wherein said mitered leveling bracket has a planar base plate with a linear slot formed therethrough, two perpendicular mounting arms with bores therethrough, said mounting arms extending from a top face of said mitered leveling bracket, an L shaped leveler screw stabilizer extending from said top face of said mitered leveling bracket therebetween said two mounting arms having a top plate parallel to said base plate with a leveler screw orifice therethrough directly above said linear slot, and a rotatable leveling foot passing through said linear slot and said leveler screw orifice; and
wherein said leveling foot is externally threaded and engages a leveling thread in the straight flange of the mitered toekick panels for leveling;
a mitered seismic bracket made of a flat plate with exterior side lips extending therefrom where two of the lips each have a mounting ears with attachment orifices formed therethrough, said mounting ears connecting the mitered seismic bracket to the mitered toekick floor mount panels via mechanical fasteners, two mounting orifices to accommodate a connection of one said mechanical fastener to said floor, and a central orifice that allows the leveling foot to pass through the mitred seismic bracket and bear onto a floor for leveling purposes.

* * * * *